US009064381B2

(12) United States Patent
Stanek et al.

(10) Patent No.: US 9,064,381 B2
(45) **Date of Patent: *Jun. 23, 2015**

(54) METHOD AND ASSOCIATED LOTTERY GAME CARD/TICKET FOR PLAY OF MULTIPLE GAME COMPONENTS

(71) Applicant: Scientific Games International, Inc., Newark, DE (US)

(72) Inventors: Edward J. Stanek, Des Moines, IA (US); Kenneth Earl Irwin, Jr., Dawsonville, GA (US); Amy Hill, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,744

(22) Filed: Aug. 20, 2013

(65) Prior Publication Data

US 2013/0337883 A1 Dec. 19, 2013

Related U.S. Application Data

(63) Continuation of application No. 13/223,567, filed on Sep. 1, 2011, now Pat. No. 8,512,123.

(60) Provisional application No. 61/440,030, filed on Feb. 7, 2011.

(51) Int. Cl.
*G06F 17/00* (2006.01)
*G06F 19/00* (2011.01)
*G07F 17/32* (2006.01)

(52) U.S. Cl.
CPC .............. *G07F 17/329* (2013.01); *G07F 17/32* (2013.01); *G07F 17/3223* (2013.01); *G07F 17/3244* (2013.01); *G07F 17/3267* (2013.01); *G07F 17/3272* (2013.01)

(58) Field of Classification Search
USPC .............................. 463/16–20, 25, 29, 40–42
See application file for complete search history.

(56) References Cited

U.S. PATENT DOCUMENTS 5,772,511 A 6/1998 Smeltzer
6,663,105 B1 12/2003 Sullivan et al.

(Continued)

FOREIGN PATENT DOCUMENTS

WO WO 03/022380 3/2003
WO WO 03/022381 3/2003
WO WO 03/089074 10/2003

OTHER PUBLICATIONS

Related U.S. Appl. No. 13/223,607, filed Sep. 1, 2011.

(Continued)

*Primary Examiner* — Milap Shah
(74) *Attorney, Agent, or Firm* — Dority & Manning, P.A.

(57) ABSTRACT

A method and associated lottery game card/ticket are provided for implementing a ticket-based, multi-component lottery game and includes providing lottery tickets for players, wherein the lottery tickets include a first game component with a first prize structure and at least one additional game component with a separate second prize structure. A first validation code is provided on the lottery ticket that is linked to a first game server for validating and redeeming the first game component of the lottery ticket. A second validation code is provided on the lottery ticket that may be linked to a separate second game server for validating and redeeming the second game component of the lottery ticket. Validation and redemption of the lottery ticket for the first and second game components is enabled by separate redemption acts.

3 Claims, 25 Drawing Sheets

FIG 5

(56) References Cited

U.S. PATENT DOCUMENTS

| | | | | |
|---|---|---|---|---|
| 7,527,556 | B2 | 5/2009 | Amada et al. | |
| 8,512,123 | B2 * | 8/2013 | Stanek et al. | 463/17 |
| 2001/0031661 | A1 | 10/2001 | Wiltshire et al. | |
| 2001/0049305 | A1 | 12/2001 | Riendeau et al. | |
| 2003/0045340 | A1 | 3/2003 | Roberts | |
| 2003/0060261 | A1 | 3/2003 | Katz et al. | |
| 2003/0114213 | A1 | 6/2003 | Bennett, III | |
| 2004/0204222 | A1 | 10/2004 | Roberts | |
| 2004/0229677 | A1 | 11/2004 | Gray et al. | |
| 2005/0215306 | A1 | 9/2005 | O'Donnell et al. | |
| 2006/0019736 | A1 | 1/2006 | Amada | |
| 2006/0172799 | A1 | 8/2006 | Kane et al. | |
| 2006/0258433 | A1 * | 11/2006 | Finocchio et al. | 463/16 |
| 2007/0149271 | A1 | 6/2007 | Gingher et al. | |
| 2007/0218980 | A1 * | 9/2007 | Pachnis et al. | 463/25 |
| 2008/0045299 | A1 | 2/2008 | Bennett et al. | |
| 2008/0174068 | A1 | 7/2008 | York et al. | |
| 2008/0182664 | A1 | 7/2008 | Kaplan et al. | |
| 2008/0254852 | A1 | 10/2008 | Wright et al. | |
| 2009/0023490 | A1 | 1/2009 | Moshal et al. | |
| 2009/0149239 | A1 * | 6/2009 | Youssef et al. | 463/17 |
| 2009/0197662 | A1 | 8/2009 | Wright et al. | |
| 2009/0221342 | A1 | 9/2009 | Katz et al. | |
| 2009/0227320 | A1 | 9/2009 | McBride | |
| 2010/0069136 | A1 | 3/2010 | Safaei et al. | |
| 2010/0102546 | A1 | 4/2010 | Rogers | |
| 2010/0105462 | A1 | 4/2010 | Walker et al. | |
| 2010/0167805 | A1 | 7/2010 | Martineck, Sr. | |
| 2010/0304828 | A1 * | 12/2010 | Bettcher et al. | 463/17 |
| 2011/0059786 | A1 | 3/2011 | Walker et al. | |
| 2011/0086692 | A1 | 4/2011 | Guziel | |
| 2011/0105212 | A1 | 5/2011 | Fiechter | |
| 2011/0105213 | A1 | 5/2011 | Irwin et al. | |
| 2011/0207516 | A1 | 8/2011 | Covington | |
| 2012/0122537 | A1 * | 5/2012 | Bettcher et al. | 463/17 |
| 2012/0202572 | A1 | 8/2012 | Stanek et al. | |
| 2012/0202574 | A1 | 8/2012 | Stanek et al. | |
| 2012/0302309 | A1 | 11/2012 | Denton et al. | |

OTHER PUBLICATIONS

Related U.S. Appl. No. 13/223,585, filed Sep. 1, 2011.
Related U.S. Appl. No. 13/223,628, filed Sep. 1, 2011.

* cited by examiner

FIG 1
100
101
102
103
104
105
106
$10
STATE LOTTERY
scratch-e
ticket
Win up to $10,000!
2 GAMES ON EVERY CARD! INSTANT WIN GAME PLUS 2ND GAME IS A MULTIPLIER FOR YOUR LOTTERY SAVINGS ACCOUNT!
Game #1
Match any of YOUR NUMBERS to any of the PRIZE NUMBERS and win the prize shown!
PRIZE NUMBERS
YOUR NUMBERS
PRIZE
Game #2
"SAVINGS WITH A THRILL"
Match any 2 and win the lottery savings account multiplier shown!
PRIZE

FIG 2
100
$10
STATE LOTTERY
scratch-e
ticket
Win up to $10,000!
INSTANT WIN GAME
PLUS CHANCE TO PLAY MORE GAMES ONLINE!
101
Game #1
Match any of YOUR NUMBERS
to any of the PRIZE NUMBERS
and win the prize shown!
PRIZE NUMBERS
7 5 2
103′
YOUR NUMBERS
9 4 1 3 6 8
3 8 9 6 4 3
104′
102
PLEASE PLAY AGAIN
Game #2
WIN A CHANCE TO PLAY MORE GAMES ONLINE!
Match any 2 and win the prize shown!
105′
107
106′
(10) ONLINE GAMES
VISIT: WWW.SCRATCH-E.COM AND
ENTER CODE: GGGYUNMJDEE
108

FIG 4
100
$10
STATE LOTTERY
scratch-e
ticket
Win up to $10,000!
2 CHANCES TO WIN!
INSTANT WIN GAME PLUS A CHANCE TO
WIN AN INTERNET GAME!
120
121
Match any of YOUR NUMBERS
to any of the PRIZE NUMBERS
and win the prize shown!
PRIZE NUMBERS
YOUR NUMBERS
122
124
123
PRIZE
BONUS PRIZE

FIG 6
150
151
153
152
STATE LOTTERY
scratch-e
PLAY FOR POINTS, TURN POINTS INTO MORE GAMES, CASH OR PRIZES!
FIRST, SELECT YOUR GAME:
POKER BUCKS
BASEBALL GREEN
THEN ENTER YOUR TICKET CODE TO PLAY:
VVNBTRDEJH
ENTER!

FIG 15
300
301
302
303
304
305
306
Win up to $10,000!
SCAVENGER HUNT
Scratch your "scavenger list" to reveal the items you need to match. Match your items to the items in the "scavenger list" to win. The more items you match, the greater your prize! Cash out any time or keep playing online for more prizes!
your scavenger list
your items
prize key: match 1 item and win $1. Match 2, $5. Match 3 and win $20. Match 4 you win $100. Match all 5 to win the $10,000 grand prize! Visit www.lottery.com/scavenger to continue playing online. Enter this code:

FIG 19
300
301″
303″
305″
306″
$10
WIN UP TO $10,000!
PUZZLE BUCK$
2 GAMES ON EVERY TICKET! A SCRATCH TICKET
-PLUS-
A PUZZLE PIECE & CODE TO PLAY ONLINE WITH FRIENDS!
Scratch your puzzle pieces. Match 3 like prize amounts and win that prize!
$5
$20
$20
$20
$50
WORK AS A TEAM TO WIN PRIZES WITH YOUR FRIENDS!

Where: G = Game Number
P = Pack Number
V = Validation Number
C = Check Digit
T = Ticket Number

440

METHOD AND ASSOCIATED LOTTERY GAME CARD/TICKET FOR PLAY OF MULTIPLE GAME COMPONENTS

RELATED APPLICATION

The present application is a Continuation Application of U.S. application Ser. No. 13/223,567, filed Sep. 1, 2011, and issued as U.S. Pat. No. 8,512,123, which claims priority to U.S. Provisional Application Ser. No. 61/440,030, filed Feb. 7, 2011.

FIELD OF THE INVENTION

The subject matter of the present patent application relates generally to games of entertainment or chance that are implemented with game tickets composed of any configuration of instant-win games, on-line games, raffle games, and Internet games, as well as to systems and methods for implementing such games.

BACKGROUND

Lottery games have become a time honored method of raising revenue for state and federal governments the world over. Traditional scratch-off and on-line games have evolved over decades, supplying increasing revenue year after year. However, after decades of growth, the sales curves associated with traditional games seem to be flattening out. Consequently, both lotteries and their service providers are presently searching for new forms of gaming.

To date there has been much speculation about enabling various lottery products to become available to the consumer over the Internet. The benefits are obvious: greater accessibility and a richer gaming environment for the player resulting in enhanced sales. However, there are various United States federal laws such as the Unlawful Internet Gaming Enforcement Act (UIGEA), the Wire Act, and other federal statutes involving interstate gambling that bring into question the legality of such an enterprise.

If Internet lottery games are to become part of the fare offered by US lotteries, appropriate adherence to state and federal laws is essential, as is designing a mechanism that meets applicable political and social constraints. It is presumed that acceptable Internet related business plans would net state lotteries increased profits. The presence of obstacles to such business plans has prevented most United States lotteries from making Internet sales a fait accompli.

In the past, United States lotteries have used the Internet as a vehicle for disseminating information about their lottery organizations, their games, and their promotions. They have also used the Internet for simulations of classic instant ticket games, games solely for entertainment without a fee, a means to communicate with players, for selling subscriptions to traditional lotto games, and for second chance drawings—drawings for prizes resulting from non-winning experiences based on the sale of a regular lottery ticket through historic channels.

Second chance drawings usually involve prizes of a minor nature compared to the main games. They are used to satisfy technical requirements involving the top tier prize availability in instant ticket games of limited size and duration with a set number of top prizes that may be awarded before the game is sold out. Second chance drawings are also used as temporary promotions to give game sales more value to lottery players. But by their nature, second chance drawings are a minor part of overall game designs, are not a principal motivator for ticket purchases, and although they have their place, they therefore have limited potential for assisting in the mainstream of lottery sales via the Internet or otherwise. They also typically have little entertainment value.

Additionally, United States Lotteries have come to appreciate the virtues of producing games with more entertainment value that can be sold at a premium price. For instance, ten-dollar scratch ticket games with higher paybacks, and more ways to win now account for over $5 billion a year in United States lottery sales. Making Internet delivered games part of the prize structure for extended play tickets is the next step advancement in United States lottery product evolution.

Moreover, as gaming technology and systems continue to evolve and become more sophisticated, numerous new types of lottery related games and products become available that require discrete new methods of funding and enabling. For example, a Digital Gate can act as a specific interface between the validation file for the Internet portion of a game and the validation file for the non-Internet game or non-Internet portion of a game. Presenting the ticket for validation results in validating prizes for payment with the Digital Gate closed could result in only the non-Internet game or games being validated with a message delivered to the validating terminal that the Internet portion of the ticket has not been accessed or played. Conversely, if the Digital Gate has been opened, the prize or prizes on the Internet portion or portions of the ticket validate and prizes can be paid in addition to the non-Internet portion thereby enabling new play styles.

Thus, it is highly desirable to develop a lottery ticket platform that provides methods of funding Internet and new gaming opportunities. Ideally, this lottery ticket platform should be evolutionary in nature, starting with a familiar format that introduces a consumer to Internet and other new gaming formats. This lottery ticket platform should have minimal impact on existing lottery validation/redemption systems, or at least have minimal apparent impact from the consumer or retailer perspective.

SUMMARY

Objects and advantages of the invention will be set forth in the following description, or may be obvious from the description, or may be learned through practice of the invention.

In accordance with aspects of the invention, a method is provided for implementing a ticket-based, multi-component lottery game, and includes providing lottery tickets for players, wherein the lottery tickets include a first game component with a first prize structure and one or more additional game component(s) with a separate second prize structure. A first validation code is provided on the lottery ticket that is linked to a first game redemption algorithm in a server for validating and redeeming the first game component of the lottery ticket. One or more additional validation code(s) provided on the lottery ticket are linked to one or more separate redemption algorithms for validating and redeeming the additional game component(s) of the lottery ticket. Validation and redemption of the lottery ticket for the first and additional game components is enabled with separate redemption acts that do not necessarily include cross-communication between the first and additional game redemption algorithms. For example, the lottery ticket may be validated and redeemed for the first game component at a first redemption time that is different than any additional redemption times for any additional game components, and at a first location that is different than any other location(s) for additional game component(s). In alternative methods, the first and additional game components are redeemable at the same location at different times.

In a particular embodiment, the first game component is one of an instant-win lottery game, such as a scratch-off lottery game, wherein the outcome of the first game component is presented to the player on the lottery ticket, or an on-line lottery game wherein the outcome of the first game component is dependent on a subsequent random generation event or predetermined, but printed at the time of purchase.

The additional game component may be, for example, an interactive Internet-based game, with the method further comprising providing an access code on the lottery ticket that enables the player to access a web site for play of the second game component. In a unique embodiment, the prize for the Internet-based game is predetermined and dictated by the additional validation code, but is only made aware to the player upon play of the Internet-based game. The method may include the requirement that play of the Internet-based game by the player must occur prior to acceptance of the lottery ticket and additional validation code for redemption. Proof of performance of the requirement may be accomplished in various ways. For example, the method may include generating a code upon completion of the Internet-based game by the player and associating the code with the second validation code. At the time of redemption and validation of the additional game component, the code must be associated with the additional validation code at the game server before any prize can be redeemed for the additional game component. In a particular embodiment, the code is provided to the player and is presented by the player at the time of redemption and must match the stored code previously associated with the second validation code for award of a prize to the player. In yet another embodiment, the Internet game server may change a Digital Gate status in the validation server to indicate that the Internet play has occurred and the prize level (if any) won. This embodiment has the advantage of seamless operation from the consumer's perspective with the disadvantage of a digital interface between the Internet game server and the validation server.

In another embodiment, the prize for the Internet-based game is randomly determined during the course of the Internet-based game and is associated with the additional validation code instead of being predetermined as discussed above. Proof of play of the Internet game may still be required, as discussed above.

The invention also encompasses proof of performance of any type of act by the player prior to redemption of the additional game component. For example, the performance of such act may not alter the prize but proof of satisfaction of the act must be satisfied and associated with the additional validation code in the game server before the lottery ticket can be redeemed for the added game component. The act may be, for example, play of an Internet game that requires the consumer to visit a particular web site, or any other act. Proof of the act may include generation of a code that is associated with the second validation code upon the consumer performing the required act. The code may be provided to the consumer, who then presents the code at the time of redemption of the lottery ticket for the added game component.

The present invention also encompasses a lottery game card/ticket that enables play of multiple game components with the same card. The card includes a first game component portion on the card, and a first validation code provided on the card. The first validation code is associated with a file in a game serve assigned to the first game component. One or more additional game component portions are provided on the card, as well as an additional validation code associated with an algorithm in a game server assigned to the added game component. The game server can be the same server that performed the first validation as well as a completely separate server, which has the advantage of distributed processing and possible backward compatibility with an existing lottery redemption system. Additionally, with this unique game card, validation and redemption of the lottery game card via a second server for the added game components redemption can be enabled by separate redemption acts without cross-communication between the first and second game servers.

In a particular embodiment of the lottery game card, the first game component portion is one of an instant-win lottery game wherein the outcome of the first game component is presented to the consumer on the lottery game card or an on-line lottery game wherein the outcome of the first game component may be dependent on a subsequent draw event. The added game component may be an interactive Internet-based game, with the card further comprising an access code that enables the consumer to access a web site for play of the second game component. The prize for the Internet-based game may be predetermined and dictated by the second validation code, but only made aware to the player upon completion of the Internet-based game. Alternatively, the prize may be determined by actual play of the Internet-based game, a random number generator, a sequential validation file, or hash file, or other means.

The present invention also incorporates a Digital Gating mechanism requiring actions by a lottery consumer in order to validate and collect a prize on a game even if the prize has been predetermined and is recognizable through deciphering of a revealed code. The Digital Gating mechanism also makes possible games where multiple consumers who may be either known or unknown to each other must cooperate in order to win a prize. Thus, the Digital Gating mechanism makes possible lottery games where the actions or decisions of a lottery consumer or consumers subsequent to the purchase of a ticket can affect the value of the prize won. The Digital Gating mechanism has the ability to operate in tandem with the ticket-based, multi-component lottery game or completely independent of that embodiment.

DETAILED DESCRIPTION

Figure 1:
FIG. 1 is a front plan view of a first representative example of a lottery instant ticket with a hybrid game feature.

Reference will now be made to various embodiments of the invention, one or more examples of which are illustrated in the drawings. It should be appreciated the embodiments are presented by way of explanation of the invention, and are not to be taken as a limitation of the invention. For example, features illustrated or described as part of one embodiment may be used with another embodiment to yield still a further embodiment. It is intended that the present invention encompass these and other modifications and variations as come within the scope and spirit of the invention.

Figure 2:
FIG. 2 is a front plan view of a first representative example of a lottery-type instant ticket of FIG. 1 wherein the Scratch-Off-Coating (SOC) has been removed revealing a non-winning standard instant ticket coupled with a winning hybrid Internet portion.

FIGS. 1 and 2 depict a first representative example of hybrid ticket 100 having two components: a standard instant ticket game 101 and a second game 102 wherein winners of the second game are allowed to play an additional interactive game over the Internet. As shown in FIG. 1 the integrity of both games (101 and 102) on the hybrid ticket are ensured by removable Scratch-Off-Coatings (SOCs) 103, 104, 105, and 106 obscuring indicia until the ticket is purchased by a consumer. This instant lottery ticket 100 is provided as one embodiment of a hybrid lottery ticket, However it should be understood that other lottery-type tickets, for example, on-line tickets printed in real time, can be used and may be more desirable in some applications. In this example, the ticket 100 resembles traditional instant win tickets and can be purchased in the normal manner at a lottery retailer. After purchase, the consumer would remove the SOCs 103, 104, 105, and 106 to reveal the, previously hidden, win/lose (103', 104', and 105') and activation code indicia data (106') (FIG. 2). The consumer would then use his or her computer, smart telephone, or other Internet device to visit the directed web site 107 via Internet browser or special application and enter the activation code indicia data 108.

Figure 3:
FIG. 3 is a front plan view of a first representative example of a lottery-type instant ticket of FIG. 1 wherein the SOC has been removed revealing a winning standard instant ticket coupled with a non-winning hybrid Internet portion.

While the ticket 100 illustrated in FIG. 2 does enable Internet play in its prize box 107, it should be noted that since a hybrid ticket includes multiple games that are generated independently, the results of one game can be completely different than the other—i.e., each game can have its own prize fund and associated validation file. For example, FIG. 3 shows a hybrid ticket 100 similar to FIG. 2 with the exception that the standard instant portion 101 displays winning indicia 103" and 104" while the Internet enabling portion 102 indicia displays non-winning indicia 105" and 106". Aside from separate outcomes, the independent generation of the two or more games on a hybrid ticket allow for different validation codes for the outcomes of two or more games. In other words, by generating hybrid lottery ticket 100 multiple games independently, each game can have its own discrete validation code, thereby allowing redemption on a multiplicity of central site systems. This feature is beneficial, since it allows for different gaming servers (e.g., standard instant ticket and Internet gaming) to validate hybrid ticket 100 claims without the need to communicate with each other. Traditional instant ticket validation systems require that instant tickets appearing to have multiple games have a common validation code therefore ensuring validation on one central site system. In the past, this common validation code was essential to ensure that the same ticket could not be redeemed multiple times. However, with the advent of tickets with hybrid games 100, the need for ensuring that the same ticket cannot be redeemed multiple times is no longer necessary for each game on the ticket. Indeed, by creating multiple validation codes for tickets with hybrid games, the multiplicity of redeeming central site systems have the ability to redeem each portion of the hybrid ticket independently, greatly reducing central site communications requirements and associated overhead.

In this embodiment, the price of the hybrid ticket 100 would include a chance to play Internet game(s) portion 102 in addition to funding the standard instant portion 101 of the ticket 100. Of course, playing the Internet games themselves could be offered as a prize assuming the games provided sufficient amusement value. Offering amusing Internet games as the prize also has the advantage of reducing the costs of the Internet portion 102 of the hybrid ticket 100 and thereby allowing for increased value in the standard instant portion 101 of the hybrid ticket. Alternatively, the Internet portion 101 could offer access to games that not only provide amusement value, but also include possible prizes at their conclusion. This embodiment has the advantage of potentially greater appeal and suspense for the consumer playing the Internet portion 102 of the hybrid ticket 100.

Figure 4:
FIG. 4 is a front plan view of a second representative example of a lottery instant ticket with a hybrid game feature.
Figure 5:
FIG. 5 is a front plan view of the second representative example of a lottery-type instant ticket of FIG. 4 wherein the SOC has been removed.

FIGS. 4 and 5 depict a second representative example of hybrid ticket 100 having an instant ticket game 120, 121, and 122 with a standard instant prize 124 and an Internet prize 123. After purchase, the consumer would remove the SOC to reveal the, previously hidden, win/lose (121' and 122') with the standard instant prize 124' as well as activation code indicia data (123'). The difference in this second embodiment is the hybrid nature of the ticket is packaged as a bonus prize. As before the Internet winning indicia 123' would enable a game to be played over the Internet which could be the prize unto itself or also have the possibility of awarding further prizes after Internet play.

Figure 6:
FIG. 6 is a front plan view of a lottery sponsored web page that allows for the Internet portion of hybrid ticket of FIGS. 1-5 to be used to play games on the Internet.

Returning to the winning Internet portion 102 of the hybrid ticket 100 as illustrated in FIG. 2 where the consumer is directed to an Internet site by specified indicia 107 to play game(s) enabled by entering the winning validation code 108 indicia that was previously hidden by SOC material 106. When the consumer navigates to the designated Internet site 150 (FIG. 6), he or she will be provided with a method of entering the winning activation code 152, possibly selecting one or more games from a multiplicity of game offerings 151, and then activating the one or more games 153.

In the embodiment where the Internet game(s) have no additional potential prize value other than entertainment, the outcome of the game(s) can be determined by: a function of the validation code indicia entered 108, a pseudo-Random Number Generator (RNG), by another event (e.g., ball drawing, cryptographic hash chain of ticket redemption codes already played, etc.), by skill, or by a combination of the previous. It should be noted, that lotteries are traditionally banned from offering games of skill for sale. However, in the special circumstance that the skill game is the prize unto itself, in most cases the lotteries are legally able to offer skill based games. Whether skill based or not, the concept of Internet games as a prize unto itself entitles consumers to win a suite of "free plays," to play a variety of Internet games of their choice with or without a chance of winning additional monetary prizes. Because the overhead on Internet play is a relatively fixed cost, games with frequent winners of small prizes can simulate the experience of churn with a possibility of prizes being banked and spent for additional play. It is also possible that some of the prizes in the Internet play could be printable coupons good for free instant tickets to get some players back to the retailer to try the game again. Furthermore, where games of skill cannot legally determine the outcome of a lottery, they can be the actual prizes offered by the lottery. In addition, some of the prizes in the Internet play can be of higher perceived value, such as an appearance on a television show that may allow the consumer to compete for additional prize(s).

In the embodiment where the Internet game(s) also offer the addition chance to win more prizes, the outcome of the game(s) can be determined by: a function of the validation code indicia entered 108, a pseudo-Random Number Generator (RNG), by another event (e.g., ball drawing, cryptographic hash chain of ticket redemption codes already played, etc.), or by a combination of the previous. Games of skill are possible and may even be desirable for Internet play assuming the laws governing the lotteries jurisdiction permit skill based games with possible additional prizes depending on outcome. However, in most cases games of skill are restricted, by law, from determining lottery winnings. This is not to say that games of skill cannot be offered where legally allowed for prizes or where the game of skill itself does not determine if a prize is won or not (e.g., spinning a virtual carnival wheel to determine a prize after a game of skill is completed).

Returning to FIG. 6, one possible example of a game would be an Internet card game 151 wherein the consumer enters the activation code indicia data 108 (FIG. 2) by typing or other means into a GAME CODE entry window 152. After entering the activation code indicia data 108 the consumer would start the game by clicking or by other means actuating the PLAY/START virtual button 153.

Figure 7:
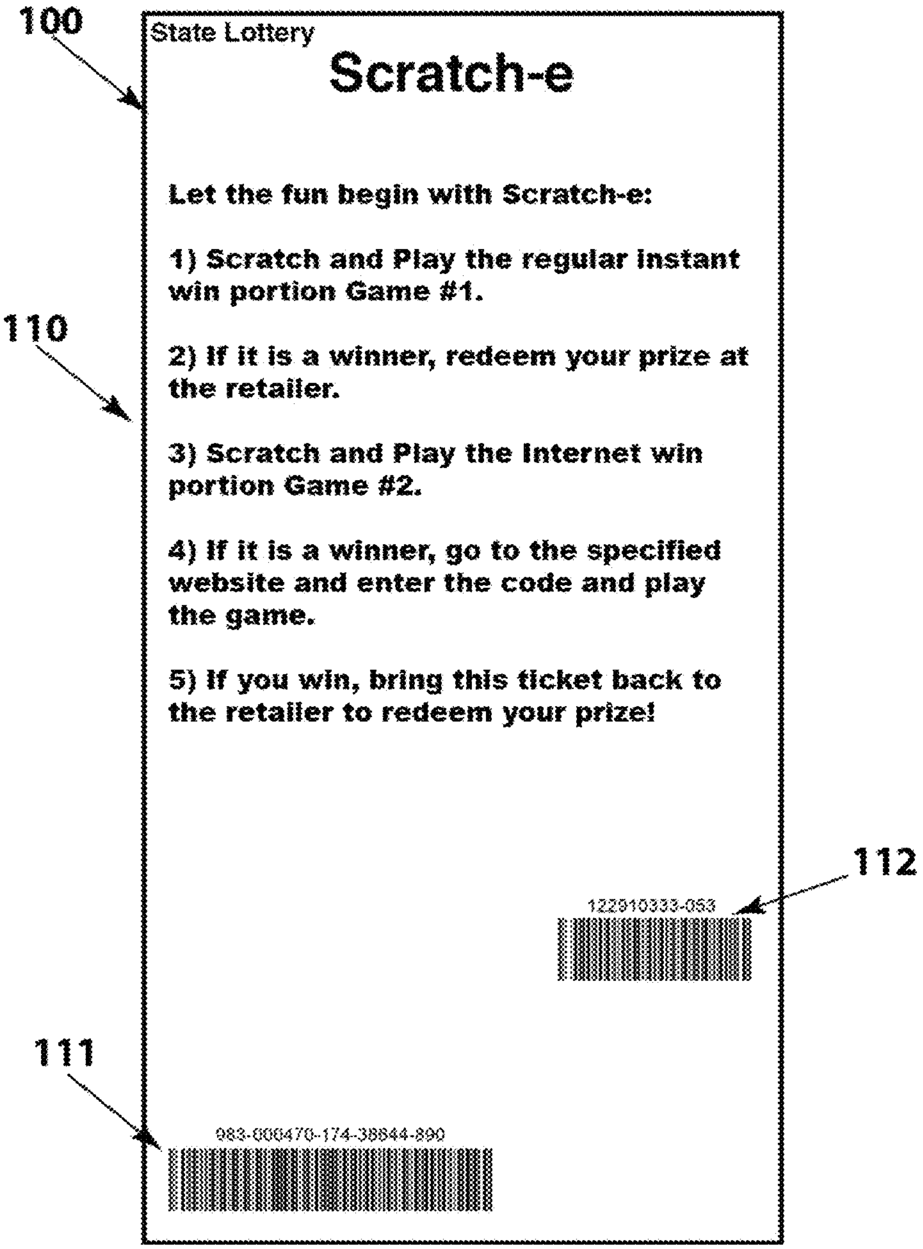
FIG. 7 is a view of the back of the lottery hybrid instant ticket of FIGS. 1-5.

Assuming the game offered has the potential to win additional monetary prizes there are numerous methodologies available for the consumer to receive his or her winnings from the lottery. For example, the consumer could request a check, or direct deposit to a specified account, or debit card account, or request a credit transfer to another game directly through the Internet interface 150. Alternatively, the Internet interface 150 could allow the consumer to print a ticket coupon, receipt, or voucher on a local printer that would include a unique redemption code identifiable by any of the lottery's terminals available throughout its jurisdiction. Another alternative would be for the consumer to transfer an electronic voucher to another portable medium (e.g., smart telephone) that enabled redemption at a retailer location (e.g., via scanning a displayed voucher barcode). Yet another alternative would be for the hybrid ticket 100 to have its own validation barcode 112 (FIG. 7) for the Internet portion essentially pointing to a separate prize fund/redemption system than the standard instant ticket inventory number 111 found, for example, on the back 110 of the hybrid ticket 100. This separate validation code 112 could be embodied as a barcode and/or human readable code as shown in FIG. 7. Alternatively, the separate validation code 112 could be embodied in other means—e.g., magnetic stripe, OCR (Optical Character Recognition), star code, etc.

The separate validation code 112 has the advantage of being readily adaptable to existing lottery redemption systems without impacting the standard instant ticket inventory control barcode 111. For example, in one possible embodiment the separate validation code 112 could emulate the structure of the lottery's existing on-line ticket (e.g., Powerball, Pick 3, Pick 4, etc.) data structure. Since on-line tickets typically are issued real-time as a wager is made at a lottery terminal, their associated unique serial number data structure functions only to reference the wager for a future drawing. When the future drawing occurs, all of the previous wagers stored in the on-line database are scanned to determine the winners. After the post-drawing scan is completed, winning on-line ticket serial numbers are automatically credited with the correct winning amounts. Thus, by emulating the structure of the lottery's existing on-line ticket data structure in an Internet ticket unique separate validation code 112, the Internet portion of hybrid tickets 102 could be readily sold without allowing any redemption until the Internet game is played on the Internet. The existing lottery on-line system would readily accomplish this scenario by initially logging all separate validation codes 112 on all tickets for a future drawing. When the consumer completes play, the system will automatically calculate the cash equivalent and log the credit to the associated separate validation code 112 in a drawing winners' file. Periodically, say once every twenty-four hours, the drawing winners' file would be transferred from the web servers and loaded onto the lottery's existing validation system. Once loaded, the lottery validation system would then automatically instruct a retailer to pay the consumer the amount credited when he or she finished the Internet portion of the game. To assist in database management, the separate validation code 112 can be algorithmically linked to the activation code indicia data 108 so long as the, hidden until purchased, indicia data 108 cannot be deduced from the, readily displayed, validation code 112. Alternatively, the validation code 112 and indicia data 108 could be two algorithmically unrelated blocks of data only linked by a secure database. Obviously, in this embodiment where the validation code 112 is linked to a drawing, there would be some notice given to the consumer that "Winning tickets can be redeemed twenty-four hours after cashing out" or words to the same effect.

In another embodiment, where the outcome of the Internet portion 102 of the hybrid ticket 100 was predetermined by the activation code indicia 108 hidden under the SOC 106 until the ticket was purchased, the validation code 112 could function as a pointer to a standard instant ticket validation file, with predetermined payouts for winning tickets. However, in this embodiment, even though the prize outcome is preordained by the activation code 108, the outcome of the Internet play could remain unknown to the consumer until play has been completed. At that point the player could take their hybrid ticket 100 to a lottery retailer who would scan the validation code 112 and award a prize. Another feature of this embodiment is, since the validation code 112 is separate from the standard instant ticket inventory control barcode 111, the ability to cash the special Internet portion 102 of the hybrid ticket 100 could be delayed by a Digital Gate(described in detail later in this patent) until after the Internet game has been played. In this embodiment, since the standard instant ticket barcode 111 is separated from the validation code 112, the consumer could cash winning instant ticket portions 101 at a different time than the hybrid Internet portion 102—e.g., cashing the standard portion 101 shortly after purchase is allowed by the Digital Gate and the Internet portion 102 only after play. This would have the added benefit of increasing traffic to the lottery retailer establishment.

In yet another embodiment of the Digital Gate, the outcome of the game (either by skill, or RNG, or other methodology) produces a code that is added to the validation code 112 that allows the ticket to be paid and may (or may not) unlock the prize amount. This code can be either transferred electronically to the Central Site from the Internet player server or given to the player when completing the game. In the later embodiment, the player would give the retailer the code (e.g., 3-digit number) that using a Digital Gate unlocks the special Internet portion 102 of the hybrid ticket 100 for payment. This code could also function as a decryption key that could additionally or optionally award the correct prize value. If a one-time-pad encryption technique were employed, this embodiment would have the added advantage of decrypting to various prize values depending on the decryption key. Employment of one-time-pad encryption with multiple decryption keys depending on prize amount would also require the decryption key to decode a significantly complex check code (e.g., keyed hash result of validation code 112 and prize value). This one-time-pad encryption embodiment thus having the advantage of allowing the prize value to be determined at the time of play by transferring the winning information to the system with the decryption key.

Figure 8:
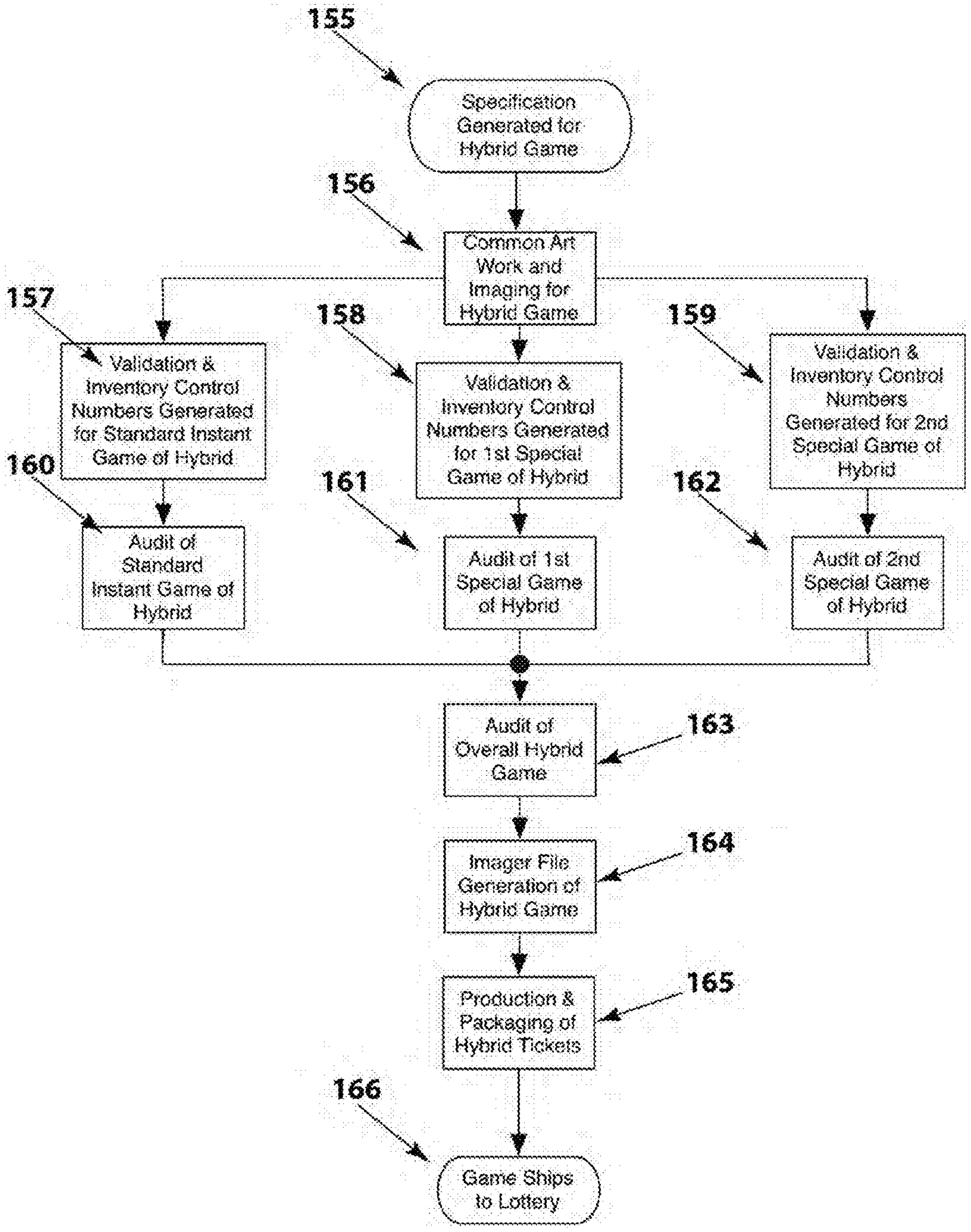
FIG. 8 is a flow chart illustrating a first method of producing and distributing lottery hybrid instant tickets used of FIGS. 1-5.

FIG. 8 illustrates a first method of producing and distribution the hybrid instant ticket of FIGS. 1-5. In FIG. 8 a set of specifications is first generated 155 documenting the overall hybrid instant ticket 100. This overall specification including subsections for the one or more additional games with separate prize structures included in the hybrid ticket 100. The generated overall specification 155 is first used to create the overall art work for the instant ticket as well as the imager fonts and appearance 156—i.e., since the separate games of a hybrid ticket are all printed at the same time the same art work is applicable to all. Once the art and imaging layout/fonts are generated 156, multiple threads are established (157, 158, and 159), each generating its own set of cipher text validation, clear text inventory control numbers, and prize shuffled for each sub-game of the hybrid game 100. While three sub-games are illustrated in FIG. 8, as is obvious to anyone skilled in the art, any number of sub-games could be implemented onto a single hybrid ticket using this methodology. After all of the codes are generated and the prizes shuffled for all sub-games (157, 158, and 159), separate audits (160, 161, and 162) are then performed to ensure the integrity of each sub-game. Since the sub-games were all generated independently, separate audits are generally the most efficient method of ensuring the integrity of each sub-game. Once the separate audits (160, 161, and 162) are completed, an overall audit 163 is performed to ensure that the hybrid ticket in its entirety is configured to specification. Having completed the overall audit 163, the image file controlling the variable images that will be printed on all hybrid tickets are generated 164 and the hybrid tickets are printed and packaged 165. Finally, the completed hybrid tickets for the entire game are shipped to the lottery or its designated party 166.

Figure 9:
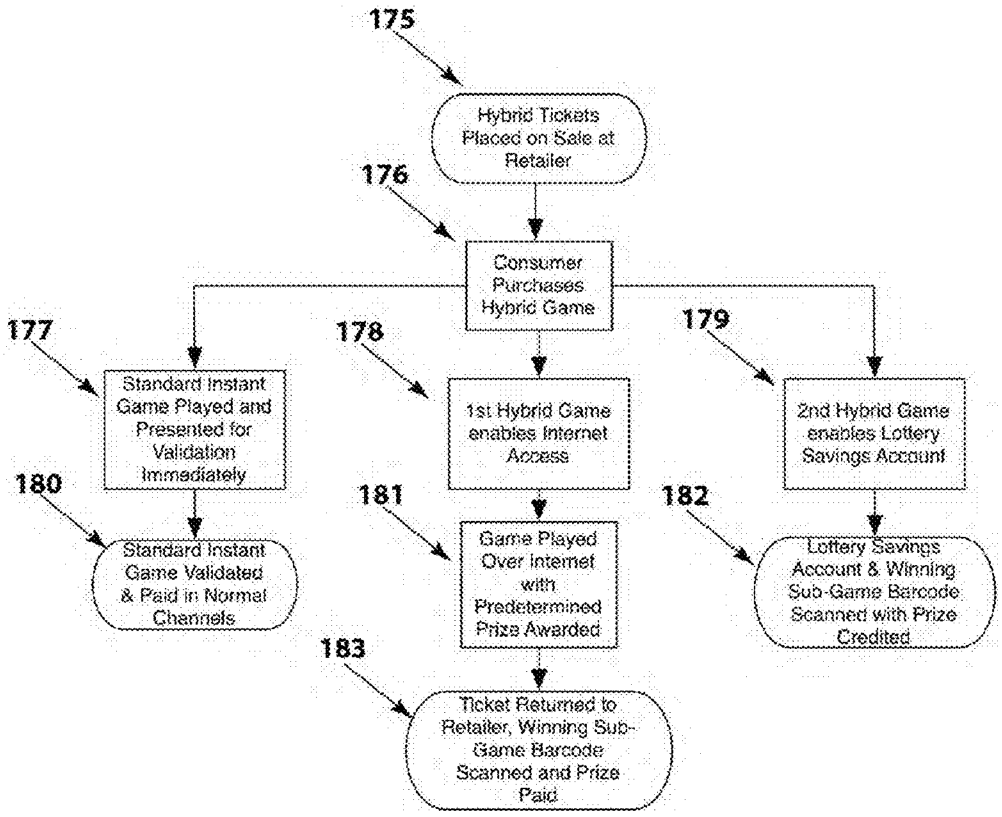
FIG. 9 is a flow chart of a first method of selling and redeeming lottery hybrid tickets of FIGS. 1-5.

FIG. 9 illustrates a first method of selling and validating the hybrid instant ticket of FIGS. 1 through 5. In FIG. 9, a retailer places the overall hybrid instant ticket 100 on sale 175. The final consumer 176 then purchases the hybrid instant ticket 100 removing all of the SOC. In this example, the removal of the SOC reveals that the three sub-games printed on the hybrid instant ticket 100 all win a prize. The first sub-game is a traditional instant ticket that the consumer immediately recognizes as a winner and presents to the retailer for validation and payment 177. The retailer scans the standard inventory barcode 111, enters any required security digits, and awards the appropriate prize 180 and returns the hybrid ticket to the consumer. The second sub-game has an Internet play feature, so the consumer must first use the code revealed by the displayed indicia 108 to play a game over the Internet 178. After Internet play is completed 181, the game informs the consumer that he or she has won a prize. The consumer then returns the hybrid instant ticket 100 to the retailer where the validation barcode 112 for the second sub-game is scanned and the appropriate prize is awarded 183 with the hybrid instant ticket 100 again being returned to the consumer. The third and final sub-game in this example reveals a multiplier code 179 for a Lottery Savings Account (252" FIG. 11). This multiplier code can then be used by the consumer to multiply whatever amount he or she has in their Lottery Savings Account. The actual means of applying the multiplier could vary from a web page interface, to a touchtone telephone, to a retailer terminal, etc. There are numerous variants on the concepts disclosed above that will vary from game to game. Digital Gates prevent awarding prizes on the sub-games until the consumer has appropriately activated the relevant portion of the Internet application.

Figure 10:
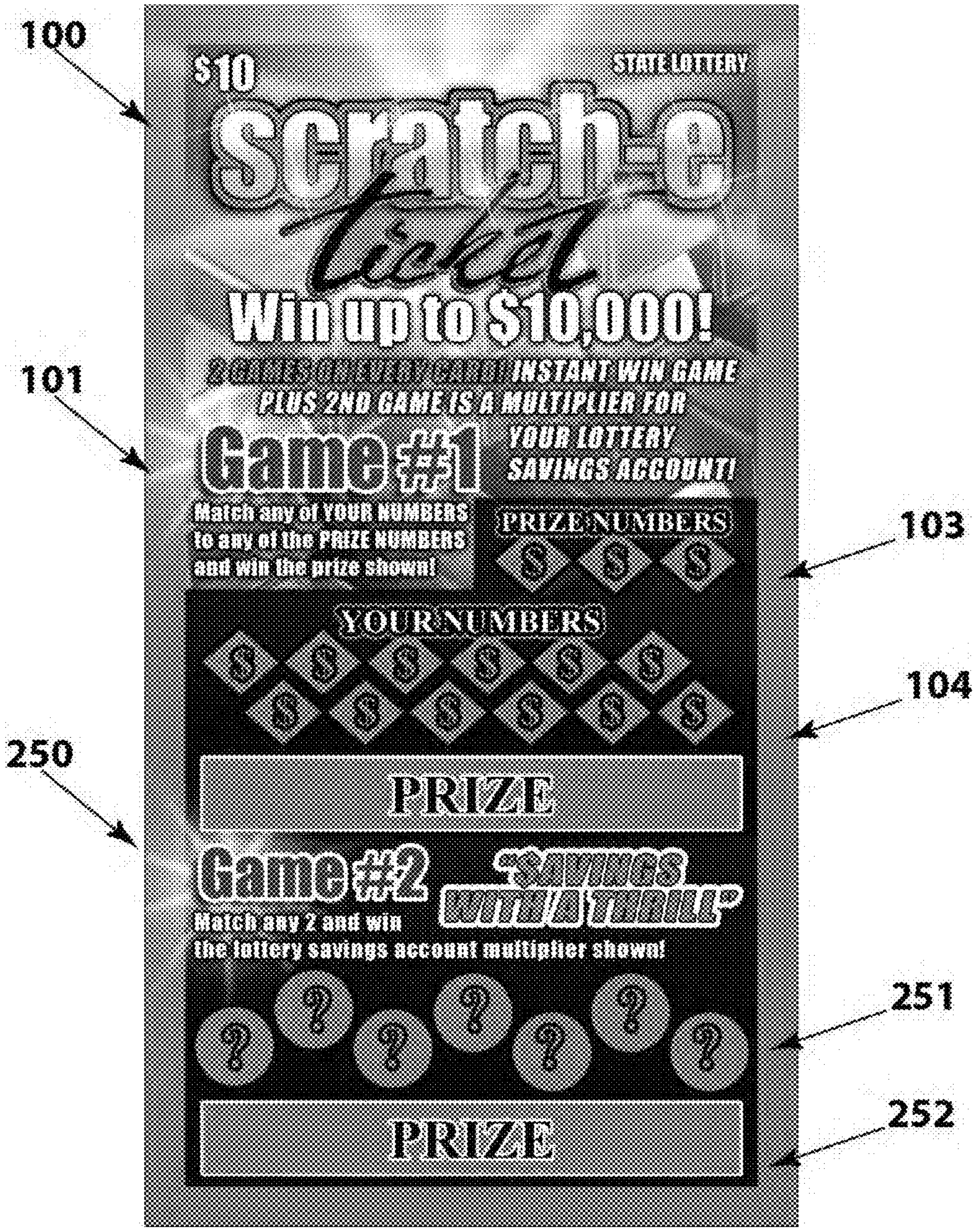
FIG. 10. is a front plan view of a second representative example of a lottery instant ticket with a hybrid game feature.
Figure 11:
FIG. 11 is a front plan view of a first representative example of a lottery-type instant ticket of FIG. 10 wherein the SOC has been removed revealing a non-winning standard instant ticket coupled with a winning hybrid game portion.

FIGS. 10 and 11 depict a third representative example of hybrid ticket 100 having two components: a standard instant ticket game 101 and a second game 250 wherein winners of the second game achieve a multiplier on a lottery savings account. Lottery savings accounts allow a player—consumer—to deposit funds into a lottery account with the chance of those savings multiplying through various lottery offerings. Returning to FIG. 11 the integrity of both games (101 and 250) on the hybrid ticket are ensured by removable SOCs 103, 104, 251, and 252 obscuring indicia until the ticket is purchased by a consumer. After purchase, the consumer would remove the SOCs 103, 104, 251, and 252 to reveal the, previously hidden, win/lose (103", 104", and 251") and activation code indicia data (252")—FIG. 11. The consumer could then have the multiplier applied to his lottery savings account via retailer, Internet, telephone, or other methodologies. There are numerous other applications for hybrid lottery tickets including some with multiple hybrid features or awarded via different means (e.g., on-line ticket printed real time) and indeed maybe more desirable under some circumstances. Digital Gates are the mechanisms that make possible the independent validation and prize awards for the melded components on hybrid tickets.

Yet another feature of the hybrid game is that it helps to introduce the concept of a Digital Gate that regulates game play. A Digital Gate is composed of hardware and/or software that control the play of lottery games. This control can be exercised in multiple manners. For example, a Digital Gate can be utilized to ensure that the Internet portion of a hybrid ticket is played before allowing validation of that portion. In other words, a Digital Gate could be configured to not impact validation of the non-Internet portion of a hybrid ticket (allowing validation for the non-Internet portion immediately after the sale of the ticket), while preventing the system from validating the Internet portion of the ticket until the consumer has actually either logged onto the specified web site or played the game to determine if he or she has won a prize. Once the consumer has played the game on the Internet the Digital Gate would swing open allowing redemption of the Internet portion. If redemption is attempted when the Digital Gate is closed (i.e., Internet portion not played in this example), a message is delivered to the validating terminal that the Internet portion of the ticket has not been accessed or played. Thus, the Digital Gate is opened by means of a consumer accessing the Internet and entering certain indicia from the ticket that may be encrypted, linking it to the purchased ticket and supplementing the prize won on the non-Internet portion of the ticket. The advantage of the Digital Gate in this example being that the consumer is forced to visit the specified web site and therefore be exposed to whatever advertising, information acquisition, and offers embedded into the specified web site. Additionally, the fact that the consumer is required to visit a specified Internet web site to find out if he or she has won a prize, most probably means that the consumer will revisit the retailer establishment after to redeem any additional winnings—thereby increasing traffic to the retailer's establishment. Of course, a Digital Gate can be employed with standard (i.e., non-hybrid) instant tickets as well as on-line (i.e., real-time printed tickets) and in some cases may be more desirable on traditional lottery games.

Figure 12:
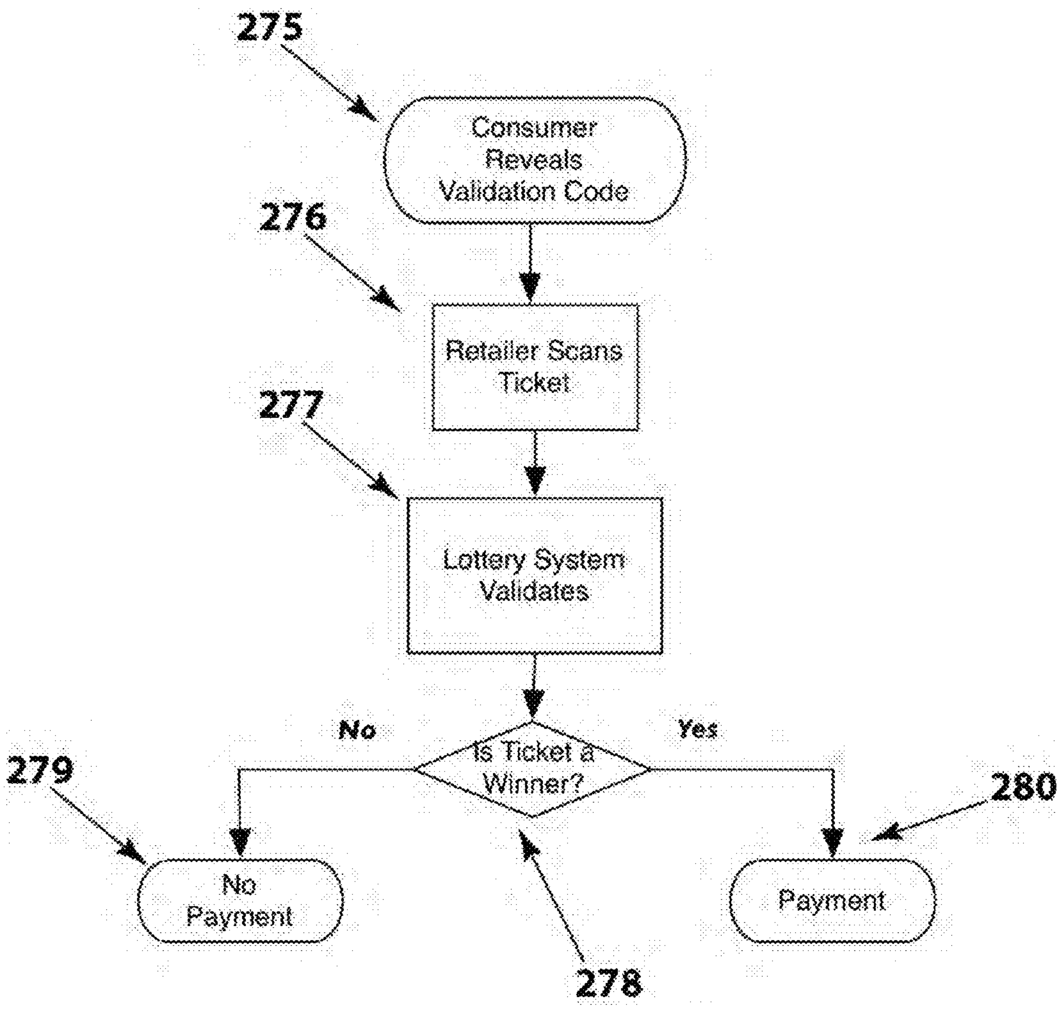
FIG. 12 is a flow chart illustrating the normal validation steps for a conventional instant ticket.

For example, FIG. 12 illustrates the general steps used to validate a conventional instant ticket. In FIG. 12 the consumer purchases the ticket, removes the SOC, to reveal the previously hidden play and validation indicia 275. The retailer accepts the ticket and enters or scans any necessary validation information 276. The lottery system then processes the scanned/entered information 277 to determine if the ticket is a winner or non-winner 278. If the ticket is a non-winner, no payment is tendered 279. However, if the ticket is a winner a payment is tendered to the consumer 280.

Figure 13:
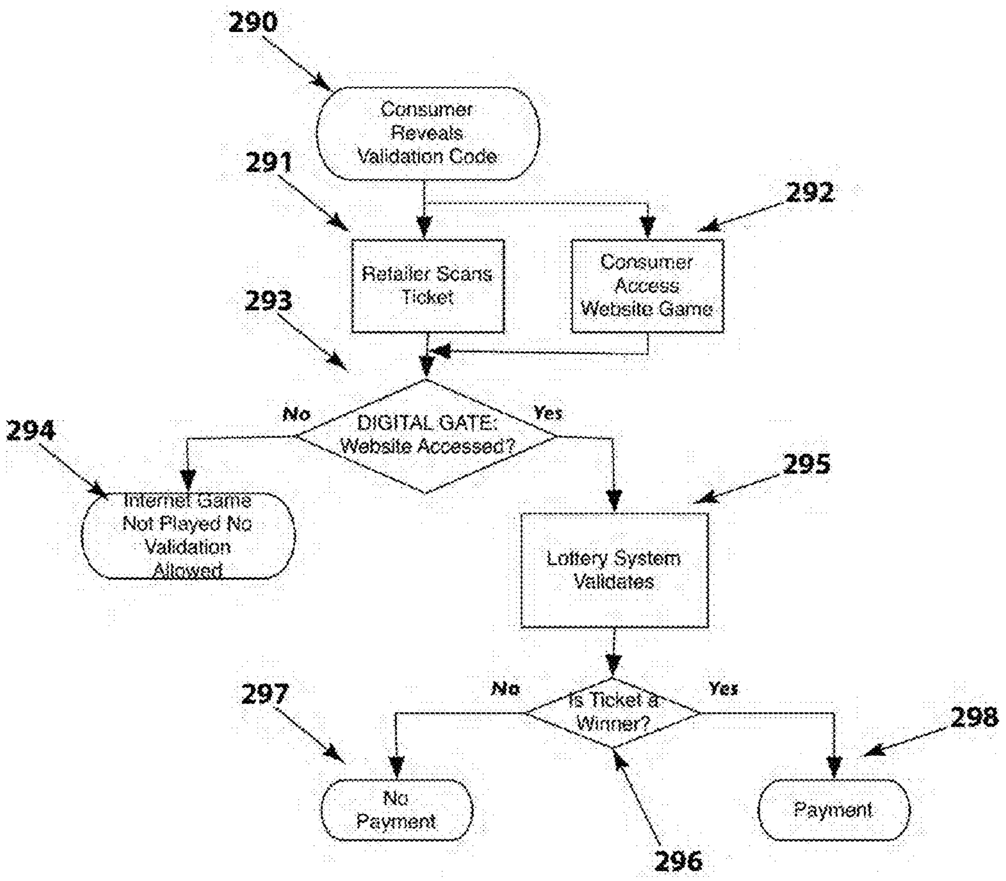
FIG. 13 is a flow chart illustrating of validation steps introducing a Digital Gate that requires player interaction with a lottery website before the lottery validation system will validate a predetermined winning play.

In contrast, FIG. 13 illustrates how this conventional instant ticket validation can be enhanced with the use of a Digital Gate. As before the consumer purchases the ticket, removes the SOC, to reveal the previously hidden play and validation indicia 290. However, with the addition of a Digital Gate 293 the validation process can become modal. In the example illustrated in FIG. 13 the ticket would have an Internet play mode that should be played before the ticket is validated by the retailer. Thus, if the consumer hands the ticket to the retailer 291 without first playing the Internet game mode, the Digital Gate 293 would determine that the Internet mode had not been played and therefore not allow validation of the ticket producing an error message 294 instructing the consumer to first play the Internet game mode. Conversely, if the consumer had accessed the website and played the Internet gaming mode 292, the Digital Gate 293 would detect that the Internet game mode had been completed when the ticket was presented to the retailer for validation 291 and thereby allow the lottery validation system 295 to determine if the ticket was a winner or non-winner 296, not tendering payments to non-winners 297 and tendering payments to winners 298. The Digital Gate 293 does not have to be associated with a hybrid game and could be used in conjunction with standard instant games that provide Internet access or other game types such as team games where all members of a team (e.g., common icon on a ticket) must validate their tickets before a second (or other) portion is enabled or prize is won.

As is also obvious to anyone skilled in the art, the Digital Gate can be employed during the validation process to add prizes from multiple parts of a ticket that are contained on separate validation files or by permitting access to multiple parts of a single validation file where not all the parts are available unless the player accesses the Internet and enters certain indicia. Furthermore, the lottery has the option of allowing the opening of the Digital Gate immediately upon the consumer accessing the Internet and entering the indicia, or allowing the Digital Gate to only open after the consumer access the Internet, enters the unique identifier code, and plays the game on the Internet to its conclusion. The Digital Gating mechanism thereby forcing a consumer to access the Internet and/or to play games that were intended for Internet play without shortcutting the extended play aspect of the game by seeking ticket validation immediately after exposing the indicia on the ticket at a retailer.

Figure 14:
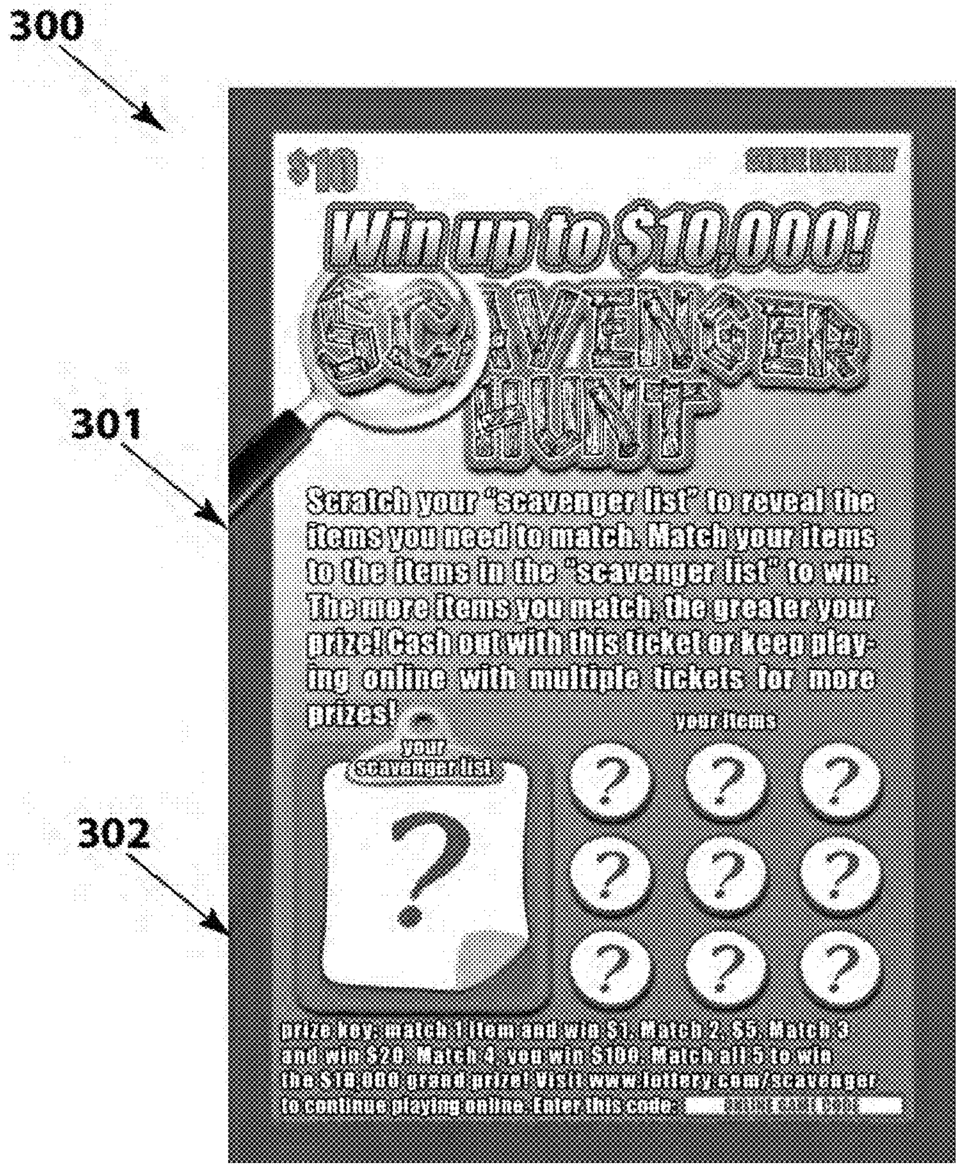
FIG. 14 is a front plan view of a first representative example of a lottery-type instant ticket with its SOC intact that optionally allows for Digital Gate(s) to increase potential winnings.

In another embodiment, the Digital Gate would permit the collection of a prize or prizes only when multiple criteria have been met by one or more consumers. By aligning multiple Digital Gates in parallel or in series, the consumer(s) can be required to complete all parts of a game before a prize can be claimed or to potentially elevate the prize value when a ticket is finally claimed. For example, FIG. 14 illustrates a Digital Gate enabled ticket 300 with a scavenger hunt theme. In this example the ticket 300 is played so that a consumer wins by finding certain objects, symbolic indicia 302 that match a given list. As explained in the instructions 301 the consumer has the option of playing a multitude of tickets allowing for enhanced combinations of symbols to award a prize or greater prize—thereby enabling the consumer to cash in by matching a certain number of escalating requirements in a game where progressive prizes are awarded for higher-level matches.

Figure 15:
FIG. 15 is a front plan view of a first representative example of a lottery-type instant ticket of a lottery-type instant ticket of FIG. 14 wherein the SOC has been removed revealing indicia that optionally allows for Digital Gate(s) to increase potential winnings.

For example, FIG. 15 illustrates the Digital Gate enabled ticket 300 of FIG. 14 with its SOC removed revealing a: four leaf clover, ace of spades, penny, star, and rabbit's foot as the consumer's required symbols (i.e., 'Your Scavenger List' 303) in the example scavenger hunt game. The goal of the game being to match as many symbols from the 'Your Items' group 304 with the 'Your Scavenger List' 303. As illustrated in FIG. 15 the 'Your Items' group 304 consist of: a four leaf clover, a number 7, a pot of gold, and several other non-winning (for this ticket) scavenger hunt symbols. With a standard instant ticket the consumer's winnings would be limited to a $5 prize (as described in the associated prize key 305) for matching the four-leaf clover and penny in the 'Your Items' group 304 with the 'Your Scavenger List' 303 as illustrated in FIG. 15. However, with an instant ticket incorporating the Digital Gating feature 300, the consumer has the option to immediately cash the ticket for $5, or hold onto the ticket 300 and register the ticket's unique identifier code 306 on the directed Internet site 305 for a chance at a higher value prize. By registering the Digital Gate enabled ticket 300 on the Internet, the consumer would unlock one Digital Gate that will allow him or her to add additional symbols from one or more other Digital Gate enabled ticket(s) 300 in the future. Thus, the consumer can use one or more Digital Gate enabled ticket(s) 300 added later to increase the number of 'Your Items' symbols 304 matching the 'Your Scavenger List' 303 from the first entered Digital Gate enabled ticket 300. Each subsequent ticket 300 entered with a matching 'Your Scavenger List' 303 symbol unlocking the next sequential Digital Gate that, in turn, increases the prize value of the original ticket (per the Prize key 305) when the original ticket 300 is redeemed. Of course, the sequential Digital Gates could unlock higher probability of prizes by allowing cross redemption with the added tickets—i.e., where the 'Your Scavenger List' 303 from each subsequent entered ticket 300 can be matched to the cumulative 'Your Items' symbols 304 from all entered Digital Gate tickets 300. The later having the advantage of a higher perceived probability of winning simply by reprogramming the Digital Gates.

Figure 16:
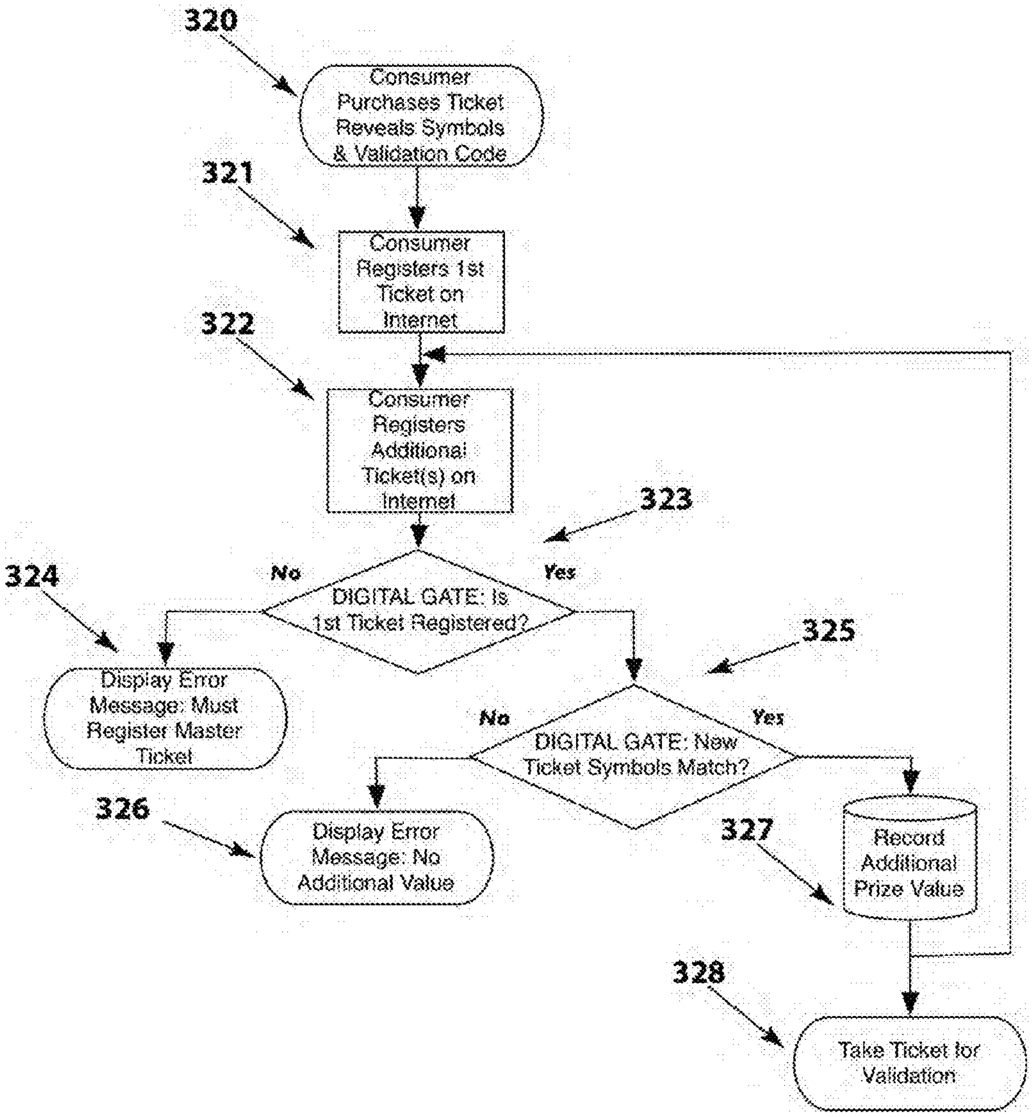
FIG. 16 is a flow chart illustrating the registration steps of the Digital Gate utilized to register the ticket of FIG. 15 on the Internet.

FIG. 16 illustrates a flowchart graphically describing how Digital Gates are employed in the embodiment of registering varying prize amounts over the Internet—similar to the game example provided in FIG. 15. In FIG. 16 the consumer purchases a Digital Gate enabled ticket and removes the SOC to reveal the previously hidden indicia 320. In this example, the consumer elects to register his ticket 300 on the Internet site 321 for a chance of increasing his or her winnings. When the consumer purchases an additional Digital Gate enabled ticket 300 and discovers that the ticket 300 has matching indicia to the first ticket (or other criteria that increases the prize value), he or she registers the new ticket as an add-on ticket to the first 322 thereby allowing him or her to combine the found symbols (or other criteria) from the two tickets for a higher prize value. When the consumer attempts to register one or more add-on ticket(s) 322 the Internet site validation system employs a first Digital Gate 323 to first determine if the 1st (Master) ticket is already registered. If no ticket was registered as a Master, the first Digital Gate 323 remains closed, baring the consumer from proceeding by terminating the process with an error message 324. However, if the consumer has previously registered his or her 1st (Master) ticket, the Digital Gate 323 opens allowing for the process to continue with the validation system determining if the added ticket(s) have additional matching (or other criteria) to enhance the Master ticket's prize value. If no additional matching symbols (or other criteria) were added with the new ticket(s), another Digital Gate 325 remains closed which terminates the process by displaying the appropriate error message 326. However, if new matching symbols (or other criteria) were found on the added ticket(s), the Digital Gate 325 swings open with the new value of the Master ticket calculated and logged on the validation system 327. As shown in FIG. 16, this process can be repeated as many times as the consumer desires until he or she elects to cash out by redeeming the ticket 328. Of course, there are multiple variations to this disclosed registration process that are obvious and in some cases more desirable than the technique previously disclosed.

Figure 17:
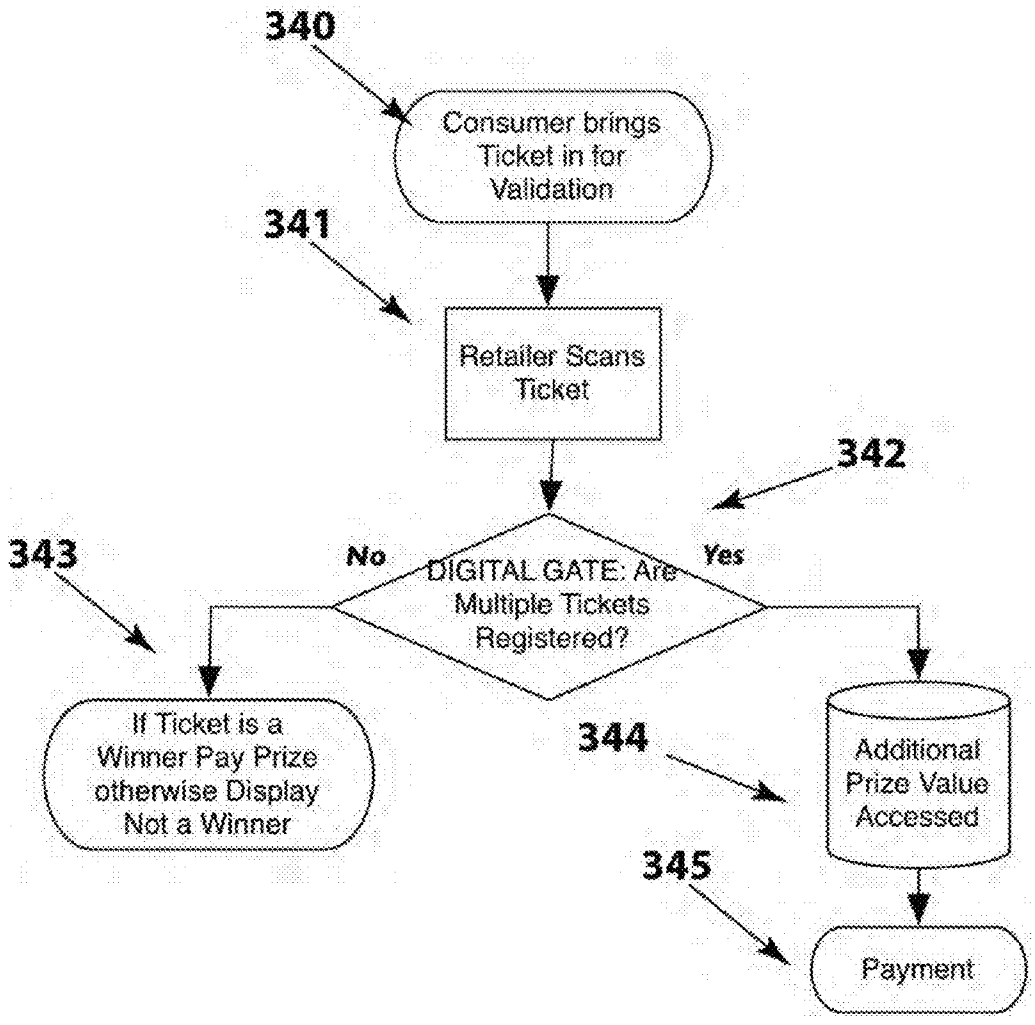
FIG. 17 is a flow chart illustrating the validation steps of the Digital Gate utilized to register the ticket of FIG. 15 on the Internet.

When the consumer decides to validate and redeem the Digital Gate enabled ticket 300, he or she would take the ticket to a retailer for validation/redemption 340 (FIG. 17). As normal, the retailer would take the ticket and scan the ticket's validation information into the redemption system 341. However, with Digital Gate enabled tickets 300, the prize value of the redeemed ticket can vary depending on whether multiple tickets were registered on the Internet. If no multiple tickets were registered, a validation Digital Gate 342 would then direct the validation system to simply validate the ticket presented for its face value 343. However, if multiple tickets were registered, the validation Digital Gate 342 would direct the validation process to retrieve the added value from the central site 343 and authorize payment for the total value of all added ticket(s) 344. There are multiple variations of this validation process (e.g., the first Digital Gate 342 could not allow redemptions until at least one ticket was added) that may be in some circumstances more desirable than the disclosed embodiment.

Typically, the Digital Gate or Gates are programmed to permit only the award of one prize claimed per ticket 300 or group of tickets 300. In other words, once a series of Digital Gate enabled tickets 300 are validated they typically cannot be validated again—i.e., the consumer cannot win still a higher prize after claiming a lower prize without starting over with a fresh set of one or more tickets. This process allows the consumer to pick his own odds in a game by electing to exit when a suitable prize threshold has been achieved. It should be noted that his elective exiting option has not been possible before the Digital Gate invention. The elective exiting option being analogous to playing a television game show where the consumer has to choose between taking winnings because of the successful completion of certain criteria, or taking a chance on winning a bigger prize by continuing to play the game.

Figure 18:
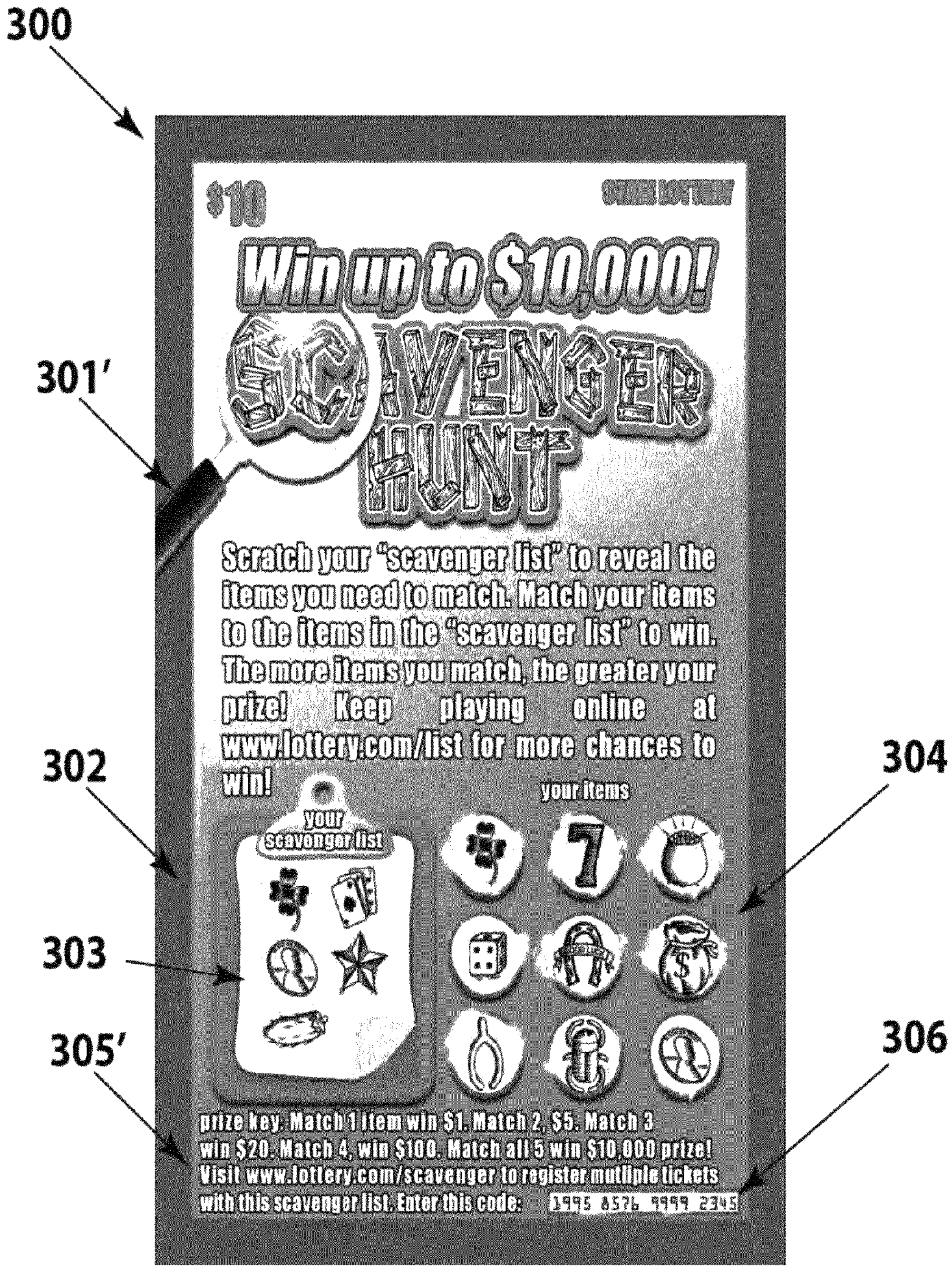
FIG. 18 is a front plan view of a second representative example of a lottery-type instant ticket of FIG. 14 wherein the SOC has been removed revealing indicia that optionally allows for Digital Gate(s) to increase potential winnings.

Another example of the disclosed Digital Gate elective exiting option invention is illustrated in FIG. 18. While similar in appearance and play style to the example disclosed in FIG. 15, a change in the instructions 301' and 305' of the second example illustrated in FIG. 18 changes the game's play style. In FIG. 18 the instruction 301' and 305' optionally direct the consumer to visit an Internet lottery site 301' to find possible additional matching 'Your Items' symbols 304. In this embodiment, the Digital Gate would be employed only during the validation process to determine if the consumer has first visited the specified Internet site to search for additional symbols to determine if the ticket 300 validates at face value ($5 in this example) or optionally validates for any additional value gained from Internet play. In this example, the value of the Digital Gate is to encourage (i.e., not force) a consumer to access the Internet portion of a game without shortcutting by seeking ticket validation immediately after exposing the indicia on the ticket at a retailer. The Digital Gate, therefore, encourages the consumer to the website where other information or promotional messages can be displayed to the consumer providing opportunities to seek consumer input and consumer subscription to promotions or other games as well as potential advertising revenue and increased traffic to the retailer.

Figure 19:
FIG. 19 is a front plan view of a third representative example of a lottery-type instant ticket of FIG. 14 wherein the SOC has been removed revealing indicia that optionally allows for Digital Gate(s) to increase potential winnings.

In yet another embodiment, the Digital Gate concept can be used to require a multitude of consumers to act separately for a single purpose thus converting single player games into social games by requiring criteria to be met through the purchase of multiple tickets before a single prize will be awarded. For example, FIG. 19 illustrates a Hybrid Digital Gate enabled lottery ticket 300 with a jigsaw puzzle theme for both its standard 303" and Internet 305" portions. In this example, the jigsaw puzzle theme is embodied both in the graphics of Digital Gate enabled ticket 300 as well as the extended Internet play social gaming feature described in instructions 301" and symbolically illustrated in 305". The standard instant ticket scratch-off portion 303" of the hybrid Digital Gate enabled lottery ticket 300 plays like any other instant ticket with the consumer removing a SOC of displayed puzzle pieces in an attempt to find three matching prizes. However, the Internet portion of the ticket 305" removal of the SOC reveals indicia instructing the consumer to log onto a specified Internet web site and enter an enabling code 306" allowing Internet game play that can be validated/redeemed with this ticket in the future.

Figure 20:
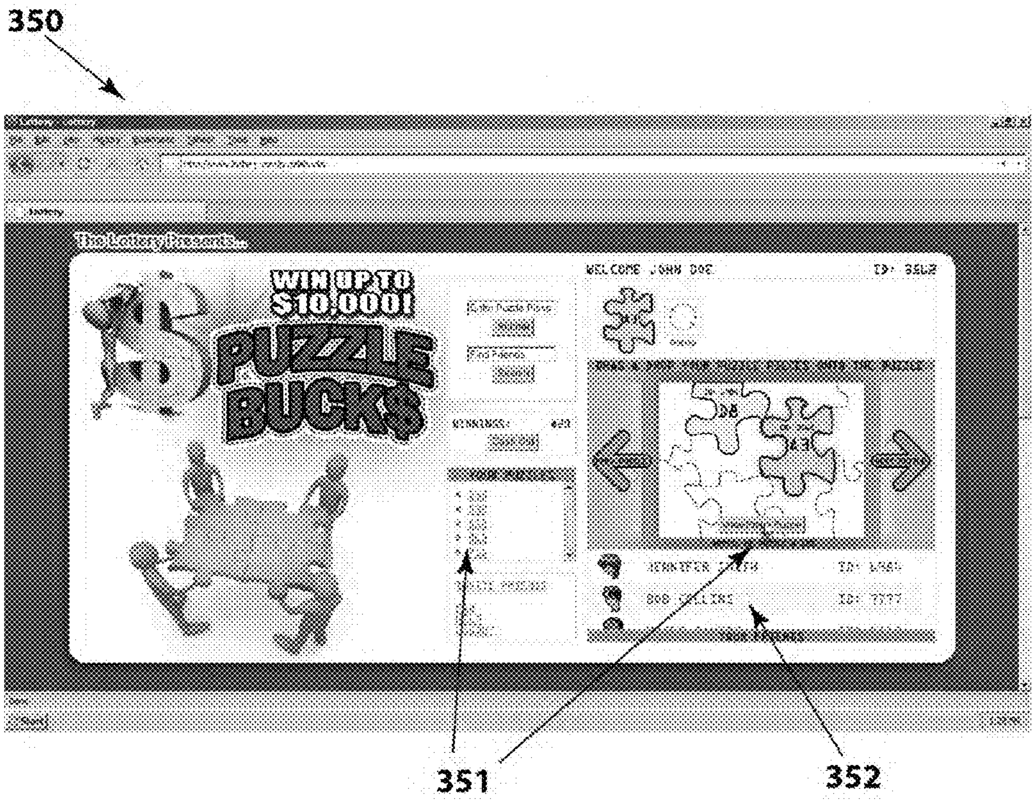
FIG. 20 is a front plan view of a lottery sponsored web page that allows for the Internet portion of hybrid ticket of FIG. 19 to be used to play games on the Internet.

There are numerous possible variations of the linked Internet web site, however for sake of an example assume a configuration that has one thousand different virtual jigsaw puzzles each containing one hundred unique virtual puzzle pieces—FIG. 20. (Of course, the choice of one thousand virtual puzzles each with one hundred unique virtual pieces is for illustrative purposes only, the actual numbers could vary substantially in practice). In this example multiple copies of each virtual puzzle would be available on the Internet web site 350 with each puzzle having its unique identifier 351 displayed on the Internet web page 350.

Figure 21:
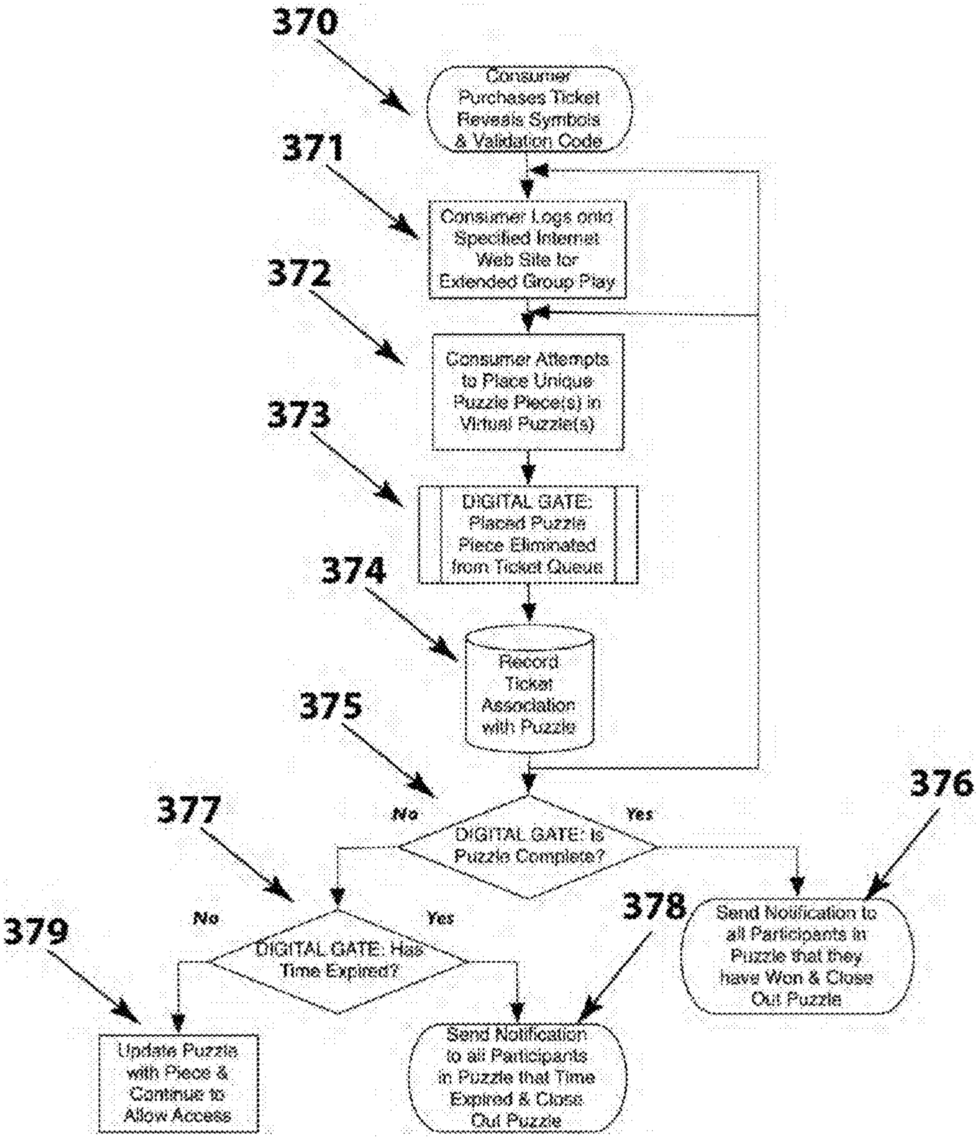
FIG. 21 is a flow chart illustrating the steps of play on the Internet enabled by Digital Gates using the ticket of FIG. 19.

In any case in this example, the objective of the game is to complete any puzzle by finding the distinct one hundred pieces necessary to complete the puzzle through multiple ticket purchases and/or the collective cooperation of friends 352 or other anonymous consumers as illustrated in the flowchart of FIG. 21. In FIG. 21 a consumer purchases a hybrid Digital Gate enabled lottery ticket 300 and removes the SOC to play both the standard game and acquire Internet access to the social networking game 370. The consumer then uses the revealed indicia 306" to navigate to the directed Internet web site and enter the unique ticket identification code 371. Once an unused code is successfully entered, the consumer is presented with a social gaming web page (e.g., 350 FIG. 20) that allows him or her to place a virtual puzzle piece in any of the multiplicity of virtual puzzles available 372 (FIG. 21). At this point the first Digital Gate 373 would close as soon as the consumer places the virtual piece in a virtual puzzle, irrevocably removing the virtual piece from the ticket so that it cannot be used for future play. Once the Digital Gate 373 is closed, the website's database 374 would be updated to log that the consumer's ticket committed its puzzle piece to the given puzzle thereby tying that ticket's redemption to the fate of the puzzle in which it was placed.

In an alternate embodiment, the hybrid Digital Gate enabled lottery ticket 300 would include multiple virtual puzzle pieces allowing the consumer to play one or more puzzles with the various virtual pieces. This embodiment has the advantage of extended play, but the disadvantage of requiring a Digital Gate to hold redemption until all puzzles played were either completed or expired in time. If this alternate embodiment was employed, the consumer would be allowed to play his or her additional puzzle pieces without having to log into the Internet web site again as illustrated in FIG. 21. Of course, the consumer could return to the Internet web site's log in screen to enter the identification code from additional ticket(s).

Returning to the flowchart illustrated in FIG. 21, once the ticket's virtual puzzle piece is logged to a given puzzle 374 a second Digital Gate 375 would verify if the addition of the consumer's virtual piece would complete the virtual puzzle or not. If the addition of the piece completed the puzzle, a multiplicity of actions would be performed 376. Specifically: the puzzle's web site graphics would be changed to illustrate that the puzzle was completed and now closed out with no additional play allowed, all registered participates in the puzzle would (optionally) receive a notification that the puzzle was completed and that they have won the completion prize (e.g., $100), and the redemption value for all tickets associated with the winning puzzle would be credited the winning amount for validation. Conversely, if the added virtual puzzle piece did not complete the puzzle, the Digital Gate 375 would direct the process to a hold mode where another Digital Gate 377 would continuously monitor if the valid time period for the puzzle has expired. If the time period has not expired, Digital Gate 377 will allow the update of the puzzle with the addition of the new virtual piece and continue to allow access 379. However, if the time period expires, Gate 377 will close out the puzzle and notify all registered participates (optionally) that the puzzle expired before completion with no prizes awarded 378.

Obviously, it is not essential to include an expiration time for a given puzzle, but the use of timing has the advantages of ease of validation and can be used to increase the play action. For example, a countdown timer can be placed on each unique puzzle and displayed on the puzzle webpage so that the time remaining is clearly displayed.

The use of additional Digital Gates in a more complex system could allow consumers who made multiple contributions to win progressive prizes in advancing proportion to their contribution to the win. Also, widely different gaming designs and themes (e.g., crossword puzzles) are also easily adapted from this embodiment with the same or a different number of Digital Gates.

This disclosed embodiment has the advantage of allowing consumers to solicit friends, on websites that they establish, or through the use of Twitter or Facebook or some other platform to find puzzle pieces to contribute to their unique puzzle and thus a collective win. Indeed, the lottery could even establish its own platform where players congregate to find partners allowing the lottery to charge for advertising or other income sources desirable of known lottery consumer traffic. Additionally, virtual chat rooms could be made available for each puzzle allowing consumers actively engaged in a specific puzzle to talk with each other. In this embodiment the prizes are structured such that a winning prize is some multiple of the cost of the ticket but much of the value in the game is the social interaction, chatter, and enthusiasm created by causing the collective interaction of consumers. It should be noted that to date, no lottery games have been designed with the social dynamic described in this embodiment.

In another embodiment, the Digital Gate(s) could be programmed so that all consumers cooperating on a single puzzle meet certain geographical requirements through geo-location. That way a collection of winners on a given puzzle might be able to congregate for a social event as a prize or portion of a prize.

In yet another embodiment, consumers could establish criteria for membership to a group—e.g., vegetarians, all must be from Chicago, all must like rap music, etc. These groups could then pool their resources for given games. The groups could regulate themselves or assign themselves specific identifiers (e.g., passwords) that identified the user as a member of a group. The Digital Gate being employed to ensure that only members of the group participated in a given game.

In yet another embodiment, larger prizes can be awarded to consumers who contribute to the completion of multiple games or puzzles within established time frames. The time frames may be regulated by Digital Gates where, as time thresholds expire, a Digital Gate changes the potential prize value. In addition to time Digital Gates might also track consumer contributions to the collective game completion. If email addresses are solicited, emails could be sent to each contributor to a particular game periodically telling them how close the game is to completion and how much time is left and what they will win if completed on time.

In still another embodiment, Digital Gates can be used to allow a consumer to enter a higher (e.g., more difficult, higher potential payout, etc.) style of play. In this embodiment an enhanced gaming experience would be enabled only after Digital Gates from lower level games were opened by a consumer or group of consumers completing those games. Alternatively, Digital Gates could be incorporated into a game that will allow a consumer or group of consumers to enter a higher style of play only if a certain fee has been paid.

In even another embodiment, Digital Gates can enable the swapping/trading of game tokens from a multiplicity of consumers. In this embodiment, an Internet site can be provided that allows for social networking to swap/trade gaming tokens (e.g., the 'Your Items' 304 of FIGS. 15 and 18 or the puzzle piece 305" of FIG. 19) from one consumer to another. The Digital Gates being used to log the transfer of tokens.

From the previous disclosures it can be seen that a Digital Gate is not a simple software or hardware function (e.g., true/false test), but a system of enabling or disabling Internet gaming functionality. This last point is significant, since the enabling/disabling game functionality of a Digital Gate greatly reduces the complexity of validating and redeeming the Digital Gate enabled lottery ticket on conventional lottery redemption systems.

Conventional lottery redemption systems typically have a non-alterable validation file for instant tickets that is loaded on the redemption system when the instant tickets are placed on sale. This non-alterable attribute of the validation file is provided for security, thereby preventing anyone from digitally turning losing instant tickets into winners. Thus, printing instant tickets with Internet play features where the outcome of the Internet game is not known a priori to the validation system at the time the tickets are placed on sale (e.g., puzzle social gaming example previously disclosed) poses challenges to the traditional non-alterable validation file paradigm.

On-line (real time printed) lottery tickets are a different matter. Since on-line tickets typically are issued in real-time as a wager is made at a lottery terminal, their associated unique serial number data structure functions only to reference the wager for a future drawing. When the future drawing occurs, all of the previous wagers stored in the on-line database are scanned to determine the winners. After the post-drawing scan is completed, winning on-line ticket serial numbers are automatically credited with the correct winning amounts. Thus, on-line databases are designed to accommodate additions to a certain point in time then a drawing occurs that determines the value of the logged on-line wagers. Once the drawing occurs with its results entered into the on-line database, some of the logged wagers have value (i.e., winning bets) and some do not. Needless to say the on-line database prevents anyone from making a bet shortly before and after a given drawing event. Yet, at the same time, the on-line database continues to accept wagers for future drawings.

The Digital Gate(s) system can operate independent of the lottery's central site validation system. Therefore, Digital Gates can control/regulate Internet game play independent of the validation system creating its own log of Internet gaming activity relative to a given ticket/consumer. This Digital Gate logging lends itself to a multiplicity of ways to resolve the lottery validation file problem.

In one embodiment the Digital Gate creates a new validation file that can supplement or periodically replace the lottery central site validation file(s). In this embodiment a validation file is generated as Internet play occurs, thereby documenting winning plays and associating those winning plays with the ticket(s) identity that was used to gain access to the Internet site. Since Digital Gate(s) can be placed at various choke points in the play process that determine increased prize values (e.g., 325 in FIG. 16 or 375 in FIG. 21), the action of the Digital Gate can be used to calculate a revised/enhanced prize value. Thus, the action of the Digital Gate lends itself to quick and compact bit mapping as a fixed field appendage to the ticket identifier code.

Figure 22:
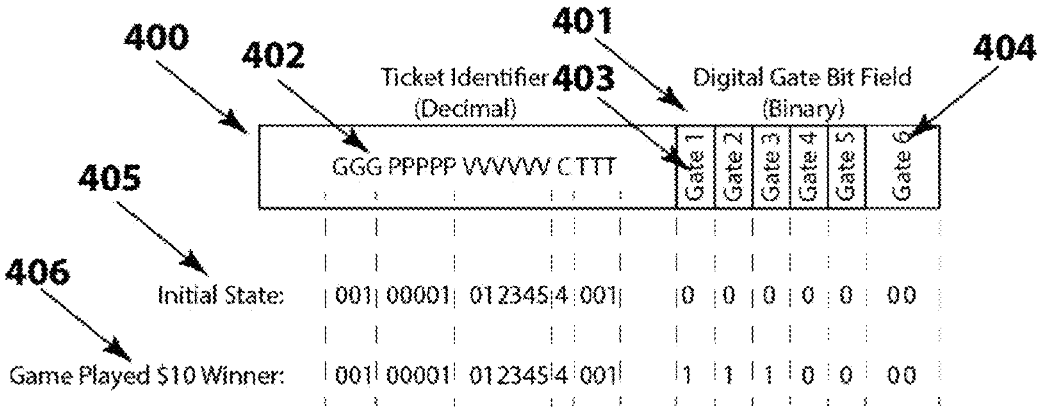
FIG. 22 is a diagram illustrating one possible Digital Gate bit map configuration.

For example, FIG. 22 symbolically illustrates one possible Digital Gate bit-mapping field. As shown in the figure, the fixed bit map field 401 is appended to the ticket identifier field 400 to create an easily indexed, fixed length, datum for the gaming database. The database being indexed by the ticket identifier field 400, which in turn is usually (for instant tickets) prefixed with a game number identifier 402 as its first three or four decimal digits. The game number 402, as its name implies, uniquely identifying the game throughout the system. Thus, a specific Digital Gate binary field 401 can be tied to a given game number 402 with the size and meaning of the Digital Gate binary field varying from game to game. With the binary field 401 illustrated in FIG. 22, a total of six Digital Gate actions are tracked, with Digital Gate-1 (403) through Digital Gate-5 having discrete binary actions tracked and Digital Gate-6 (404) having three or four possible states tracked. At login, when a particular ticket is initialized, the Digital Gate binary field would all be initialized to the same setting (all zeros '0' in this example) 405. After game play the Digital Gate binary field will change 406 based on the actions of the consumer. These changes in states can vary from game-to-game (e.g., Gate-1 may represent the ticket was logged onto the Internet web site, Gate-2 may represent a gaming option, etc.) but ultimately represent a log of the pertinent consumer actions on the designated Internet web site including prize(s) won—e.g., the binary status of '1110000' equates to a $10 winner in the example 406 in FIG. 22. Whenever desired, this Digital Gate binary field can easily be appended to an existing validation file allowing the core validation file to remain unaltered, or used to generate a new validation file, or used to alter an existing file. As will be appreciated by anyone skilled in the art, the aforementioned is simply one embodiment of a multiplicity of possible variations for Digital Gate binary fields. Indeed the instant ticket identifier format disclosed in this embodiment can vary substantially and on-line ticket identifiers typically employ a different format altogether. Also, there are numerous other means of recording the Digital Gate status (e.g., byte-mapped fields, decimal encoding, etc.) that may be preferable under some circumstances.

One approach to integrating the Digital Gate binary field embodiment would be to periodically generate a new validation file. This validation file could then be used to replace the extant file on the lottery's central site system. This embodiment has the advantage of simplicity, but the disadvantages of requiring the central site to repeatedly load new validation files (a process that is not normally done) as well as requiring the consumer to wait for a predetermined time period (e.g., 24 hours) before cashing his or her winnings. Additionally, periodic reloading of the validation will pose security challenges unless careful protocols are employed—e.g., hash chain based on previous and new validation file in addition to digital signatures.

Another embodiment would be to utilize the Digital Gate binary field to create virtual drawings on the lottery's on-line system. In this embodiment, the ticket identifier format would emulate the structure of the lottery's existing on-line ticket (e.g., Powerball, Pick 3, Pick 4, Keno, etc.) data structure. Thus, by emulating the structure of the lottery's existing on-line ticket data structure in an Internet ticket, the Internet tickets (or Internet portion of a ticket) could be readily sold without allowing any redemption until the game is played on the Internet—i.e., 'drawing event' in the on-line system vernacular. The existing lottery on-line system would readily accommodate this scenario by initially logging all Internet ticket identifiers as pending results for a future drawing. After the consumer completes the game, the system will use the Digital Gate binary field to confirm play (i.e., drawing has occurred) and to automatically calculate the cash equivalent of any winnings and then log the credit to the associated ticket identifier in a drawing winners' file. Periodically, say once every hour, the drawing winner file would be transferred from the web servers and loaded onto the lottery's existing validation system. Once loaded, the lottery validation system would then automatically instruct a retailer to pay the consumer the amount credited when he completed the Internet game. The payment authorization being accomplished by conducting a future virtual drawing for the pending tickets where the future virtual drawing results were known a priori when the consumer completed the game thereby allowing for the bet field of the associated ticket serial number to be filled in with the correct bet data to award the appropriate prize when the future virtual drawing occurs. Alternatively, the results of the virtual future drawing can be altered to be compatible with the bet fields of the pending tickets to produce the appropriate prize values(s). Obviously, in these embodiments where the ticket identifier is linked to a drawing, there would be some notice given to the consumer that "Winning tickets can be redeemed two hours after leaving the Internet site" or words to the same effect.

Figure 23:
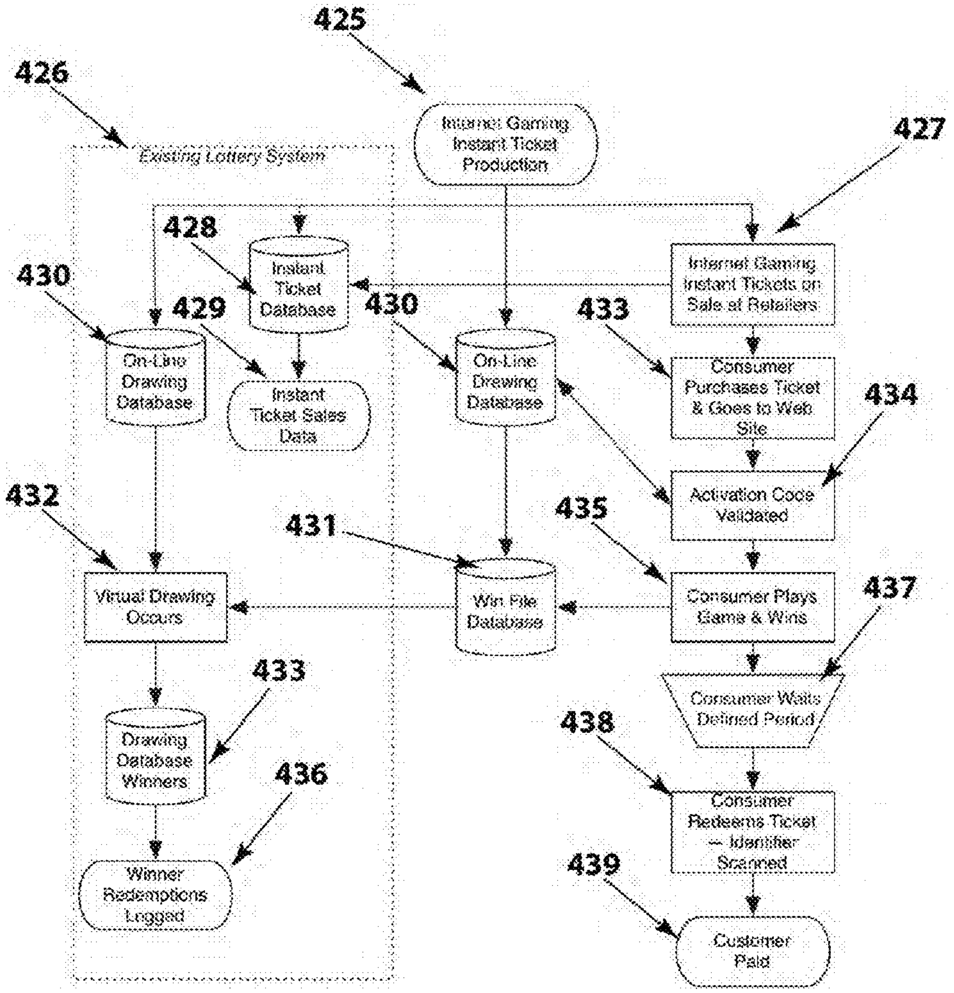
FIG. 23 is a flow chart illustrating a first method of producing, distributing, and selling lottery-type Digital Gate enabled instant tickets.

FIG. 23 illustrates a first method of producing and selling the Digital Gate enabled lottery tickets of the type 300 of FIG. 15, FIG. 18, and FIG. 19. In this case it is contemplated that the Digital Gate enabled lottery tickets would be distributed within an existing distribution network already in place for instant lottery games and the tickets could be redeemed with the existing system (426 in FIG. 23). However, in this case, since the outcome of the Internet game 300 is not predetermined, there can remain the added tasks of transferring winning amounts to the drawing winner database when the consumer completes the Internet game as a winner.

Beginning at block 425 on the flowchart illustrated in FIG. 23, the institution responsible for printing a lottery's instant tickets produces a run of Digital Gate enabled lottery tickets of the type 300 of FIG. 15, FIG. 18, and FIG. 19. As is normal in this type of production process, the produced instant tickets are delivered to the lottery and placed on sale at the lottery's retailers 427. As is also routine in instant ticket production, a digital file representing the shipping and validation information for the entire instant ticket run is delivered to the lottery's central site system 428. Under normal operations this file would be used for both inventory control as well as validation, however in this embodiment the tickets of the type 300 of FIG. 15, FIG. 18, and FIG. 19 simply fund the Internet gaming portion and therefore the winning or losing status of a given ticket is not known at the time of production or sale. Therefore, the instant ticket database will be utilized in this embodiment primarily for logistical control and accumulating sales data 429.

As shown in the flowchart illustrated in FIG. 23, there is one more deliverable 430 from the instant ticket printer, in this embodiment, that is normally not required for instant tickets. This On-Line Drawing Database 430 contains all of the unique ticket identifiers from all of the tickets of the type 300 of FIG. 15, FIG. 18, and FIG. 19 produced. In theory, the delivery of this on-line database 430 to the lottery's existing central site system 426 is optional, since all of the on-line serial numbers delivered will be for a virtual drawing at a future date with no immediate value. However, most lottery redemption systems require that a file exists for all sold on-line drawing serial numbers before a drawing can occur. This being the case, the delivered on-line database file 430 would function as the sold on-line drawing tickets, even though the instant tickets of the type 300 of FIG. 15, FIG. 18, and FIG. 19 are put on sale (i.e., not yet sold) at the time the file 430 is delivered.

A related or identical copy of the same on-line database is also delivered 430 to the web server running the Internet game. This copy of the database is used by the server to: determine the authenticity of received unique ticket identifier data, ensure that no ticket identifier is credited twice, and to generate the correct ticket identifier codes for the tickets associated with winning games (i.e., where the consumer wins an Internet game) in the Win File database 431. It should be noted, that the related or identical copy of the on-line database 430 could be simply replaced with the on-line database 430 resident at the lottery's central site 426 with all Internet gaming transactions being conducted by the lottery's central site system. Indeed, in new applications this embodiment may be more desirable. However for adding Internet gaming to existing lottery central site systems 430 that were not originally designed to accommodate this type of interface, it may be desirable to implement the Internet functionality on separate servers for ease of integration. Obviously, these separate servers could be physically located at the same location as the existing lottery central site system 426.

Next in this example, the consumer purchases a ticket 433 and visits the specified Internet gaming site via web browser, specific application, or other means. When the consumer enters the unique ticket identifier data 434 by typing or other means into an entry window, the entered data is transferred to the server containing the on-line database 430 where it is both authenticated and checked to ensure that the same unique ticket identifier data has not been used before. If the unique ticket identifier is incorrect or has been used before the appropriate error message will be returned to the consumer and game play will not be allowed. However, if the unique ticket identifier is authentic and unused, the lottery server will then allow Internet game play until completion. Assuming the consumer won a prize 435, the associated Digital Gate binary field will be transformed into a cash equivalent and logged with the consumer's unique ticket identifier on the Win File database 431. After completing the game, the consumer will receive a notice indicating when (if not immediately) he can cash his ticket at a lottery retailer.

Virtual drawings will be periodically conducted 432 at the lottery central site 426 for the Internet game. The time period for the virtual drawing is flexible and could be every twenty-four hours, or even as often as every minute. The purpose of the virtual drawing is to load the winning tickets unique ticket identifier codes onto the lottery's central site system 426 so that the existing infrastructure of retailers can cash tickets that became winners after Internet game play. By conducting a virtual drawing for these winning tickets as they are created, the existing lottery central site system 426, on-line drawing software accepts the newly generated winners without significant modification and generates the appropriate Drawing Database of Winners 433. Winning unique ticket identifier codes from previous drawings can simply be rolled over into the latest Drawing Database of Winners 433 with the old file being deleted or modified depending on the nuances of the lottery's central site software system 426.

As soon as the consumer has waited the predefined time period (if any) 437 he can cash his ticket (assuming it was determined to be a winner by Internet game play). To cash his ticket, the consumer simply goes to any lottery retailer who then scans the ticket's unique ticket identifier code on their lottery terminal 438. The authorization to pay the consumer would then be given in a similar manner to any on-line (i.e., drawing) winning ticket with the winning ticket being logged at the central site as paid 436 and the consumer receiving payment 439.

The previously described system can be completely integrated into the existing lottery's system 426 or set-up with different components for the Internet gaming portion. In the latter case, the Internet portion can even be operated by a different entity than the lottery's central site 426.

This separation of functionality has the potential to both reduce liability and enhance security. In either case, it is essential that particular attention to the security of the Internet game portion be applied since the game of the type 300 of FIG. 15, FIG. 18, and FIG. 19 outcome is not predetermined. All of the Internet game logical components associated with the outcome of the game are located on the Internet Game Server and not the consumer's Internet interface device. This separation is essential because various web browser applications (e.g., Java) can be easily decompiled at the consumer's device and are susceptible to various forms of Spoofing attacks. Even if the consumer's interface is supplied by a custom application (e.g., iPhone app), the fact that it runs on a platform outside of the control of the lottery makes it susceptible to fraudulent attacks. It is therefore, undesirable to log Digital Gate binary field information and decide if a winner on the Consumer's interface device.

Figure 24:
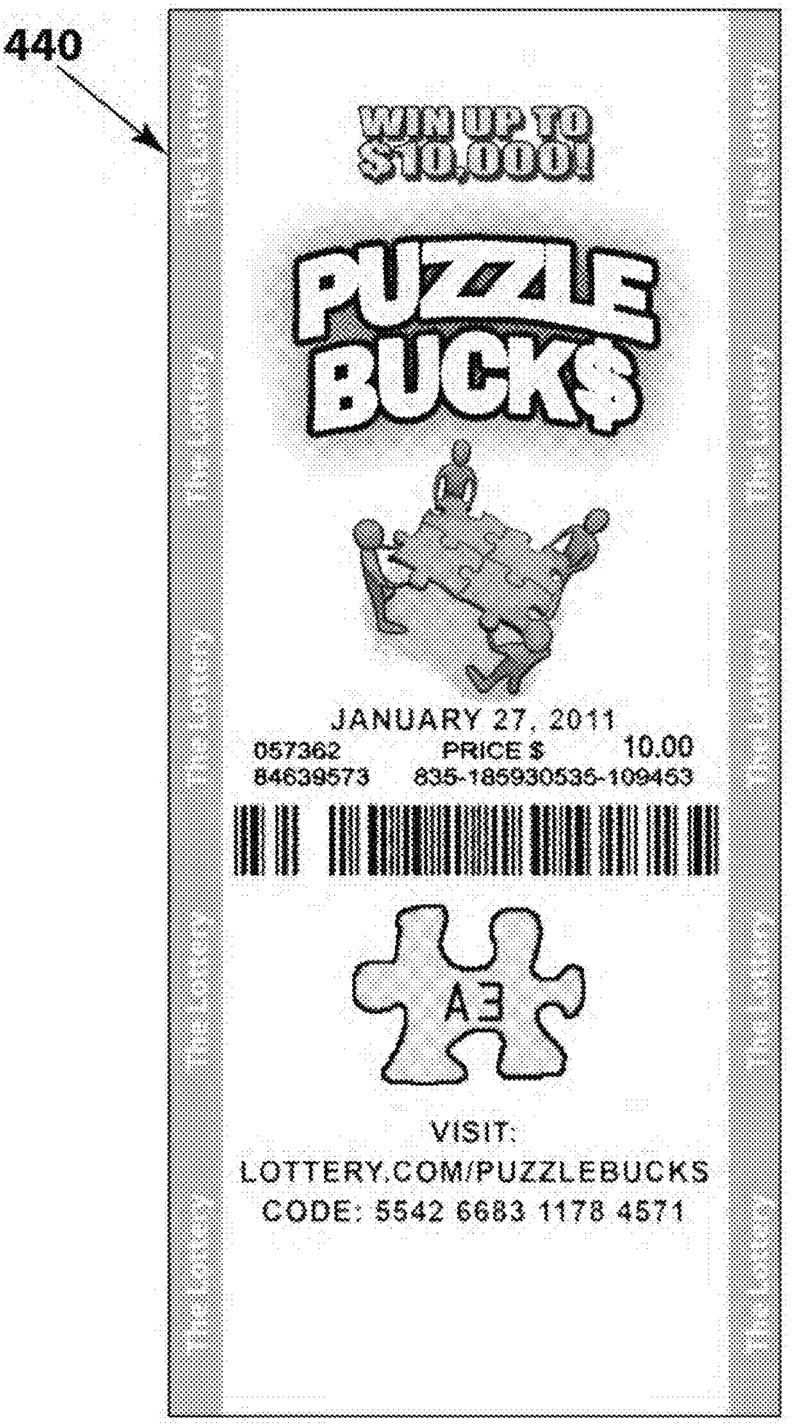
FIG. 24 is a front plan view of a fourth representative example of a lottery-type on-line ticket allowing for Digital Gate(s) to enable potential winnings.
Figure 25:
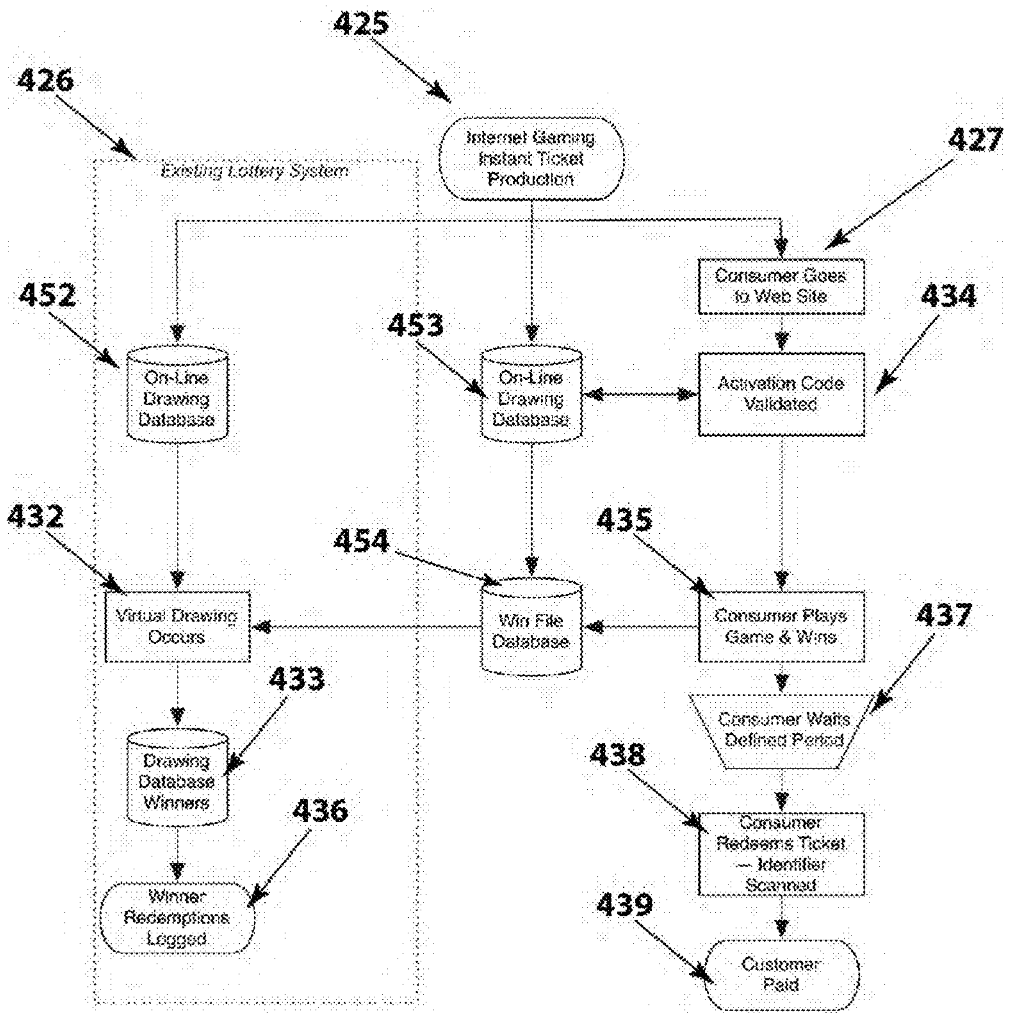
FIG. 25 is a flow chart of a second method of producing; distributing, and selling Digital Gate enabled on-line tickets.

As will be appreciated by anyone skilled in the art, the aforementioned is simply one embodiment of a multiplicity of possible variations. For example, as is previously discussed, this embodiment can also be funded with on-line tickets printed real-time at the time of purchase—440 FIG. 24. Indeed this embodiment does result in a simpler system as shown in FIG. 25, albeit with modifications to the existing lottery central site 450 to accommodate generation of on-line Digital Gate enabled lottery tickets. This embodiment can also be enabled with security codes given to the consumer via an Internet interface that the consumer transfers to the lottery or their representative via electronic mail, printed facsimile, or portable device (e.g., machine readable barcode displayed on a smart telephone), or other means.

FIG. 25 illustrates a second method of producing and selling Digital Gate enabled lottery-type tickets. In this case it is contemplated that the ticket funding the Internet game would be sold within an existing distribution on-line network already in place for drawing-based-games (e.g., Powerball, Pick 3, Pick 4, etc.). Thus, in this embodiment the consumer would purchase a ticket from the retailer with the ticket and prize claim code (ticket serial number) printed real-time at the time of purchase 451. When the purchase is made, the existing lottery central site system 450 On-Line Drawing Database 452 would be updated with the purchased ticket serial number (prize claim code) awaiting a drawing. Also, as before, a related or identical copy of the same on-line database is also delivered 453 to the web server running the Internet game. Again, this copy of the database is used by the server to: determine the authenticity of received ticket serial numbers, ensure that no ticket serial number is credited twice, and to generate the correct prize claim codes for the tickets associated with winning games in the Win File database 454. As before, the consumer would then take the purchased ticket and go to the directed web site to enter the ticket serial number printed on the ticket. The remainder of this second method embodiment is identical to the first embodiment and will not be repeated here for sake of brevity.

Yet another embodiment could be to use the Digital Gate binary field to generate a new ticket serial number that the consumer could receive in a human readable format and/or printable in a machine-readable format (e.g., barcode) at the end of winning game play. This new ticket would be presented to the retailer for payment in a similar manner as existing tickets. However, this ticket would have the advantage of a custom generated serial number with the winnings known a priori to the system. This in turn would allow for new validation files to be generated periodically.

In yet another embodiment, the Digital Gate binary field enabled instant ticket could include all possible outcomes encoded into its validation field and thereby included in the ticket's unique identifier. With this embodiment, a player winning on Internet play would be given an activator code that would be an encrypted version of the ticket's Digital Gate binary field. This unique activator code would then cause the ticket to redeem for the amount won on the Internet without modifying the validation file, since the activation code would determine the prize value. This embodiment has the advantage of not altering the existing validation system and the possible disadvantage of security vulnerabilities (e.g., if the validation code is not sufficiently long the system would be vulnerable to Birthday Attacks) as well as requiring the consumer to remember or print out the associated validation code. Of course, the consumer remembering/carrying a validation code problem could be resolved by direct transferring the encrypted validation code to the lottery central site system, but this will result in a slight modification to how the system operated.

While there are advantages to Digital Gate enabled games too numerous to list in totality, Digital Gate enabled games under certain circumstances, however, introduce a new problem of not being able to accurately judge the Expected Value (EV) of a game at the time of production. For example, the puzzle game previously disclosed through its Digital Gate invention introduces a new social networking play dynamic where various people can work together for their mutual benefit—i.e., where anyone that participated in the completion of a given puzzle wins a prize. In this example, the social networking Digital Gates gaming experiences have no: predetermined outcome (e.g., standard instant tickets), or statistically narrow payout (e.g., Pick 3 game, RNG based games, etc.), or pari-mutuel payout (e.g., Powerball, horse racing, etc.) Therefore, some social networking types of Digital Gate enabled games create a prize pool and associated Expected Value (EV) that will be extremely hard to calculate in advance. The problem being the actions of a large group or an individual exhibiting unanticipated behavior can significantly impact the actual payout of a game beyond the Expected Value (EV) plus or minus (±) two or three sigma (i.e., standard deviations) which was derived from classical calculations. Thus, the Digital Gate enabled social dynamic, while introducing a new style of gaming and creating a potential new source of revenue also has the potential to introduce wide swings in the EV for a given game—i.e., greatly expanding the standard deviation flux from the mean.

Fortunately, Digital Gates also provide a solution to this standard deviation flux problem. By continuously monitoring the number of Digital Gates opened and closed for a given game dynamic, real time metrics of the game's redemption probability can be calculated and applied to or compared with the initial EV. In essence, the various Digital Gate statuses provide a convenient quantization of the progress of a game. By maintaining running totals of Digital Gate counts, the system can be cognizant of how close a particular game is to completion and subsequent payoff. These Digital Gate running counts can then be utilized as raw data for more complex algorithms that can help provide statistics for predicting/regulating future results.

In one embodiment, the number of Digital Gate openings or closures indicates the number of positive solutions (s) achieved toward completion of a game. In another embodiment the number of positive solutions (s) can be divided by a given time period (e.g., one minute) to derive a velocity of solution ($V_s$), thereby providing a dynamic measurement of how quickly a game is being resolved. For example, in the puzzle game of FIGS. 19 and 20, a significant Digital Gate metric for would be the number of Digital Gates closed (373 of FIG. 21) when a puzzle piece is placed in a puzzle—the game being structured where all contributors to a puzzle win a prize if the puzzle is completed before time expires. This metric s can easily be accumulated and divided by a given time period (e.g., one hour) to produce a $V_s$ for a given puzzle and/or an overall $V_s$ for the entire game.

In yet another embodiment, a higher level of dynamic abstraction can be achieved by calculating the rate of change of $V_s$ to derive the acceleration of solution ($A_s$).

Further statistical analysis (e.g., running averages, standard deviations, chi-squared, etc.) can be applied to these metrics (i.e., s, $V_s$, and $A_s$) producing predictions of the likelihood of a game or set of games being completed within the given timeframe (or other parameters) thereby producing winning payouts. The aforementioned predictions allowing for the overall EV of a game or set of games to be estimated/adjusted from both the game provider and consumer perspectives to closely track original expectations. Trend lines and error margins of s, $V_s$, and $A_s$ being calculated and extrapolated to project if a game or set of games will ultimately payout within a reasonable range of the initial EV. In the event that the game or set of games is not redeeming as expected, these extrapolations can then be utilized to adjust the payout and structure of future games to help ensure the EV returns to initial expectations.

In one embodiment, this adjustment can be accomplished by utilizing the historical s, $V_s$, and $A_s$ and other data accumulated from similar games previously played to help determine the structure of future game designs.

In another, more sophisticated embodiment, the dynamic s, $V_s$, and $A_s$ and other data can be utilized to control the dispersing of game pieces during sale. In other words, as real time printed Digital Gate enabled game tickets (e.g., 440 of FIG. 24) are sold, the associated virtual game pieces dispensed with the tickets will be adjusted to make it easier or more difficult to complete—depending on how the games are redeeming. The resulting dynamic EV data being applied to both presently open and future games making them easier or more difficult to complete depending on how the dynamic EV compares to the EV anticipated when the game was first placed on sale. This easier/more difficult adjustment accomplished by the ratio of alike/different game pieces released at the time of sale as well as the number of scarce game pieces released—i.e., different game pieces can have different frequencies of appearance in printed tickets.

In another embodiment there would be a number of sub-games within each set of games (e.g., individual puzzles 351 in the general game example of FIGS. 19 and 20). At any given time period a limited number of sub-games (e.g., twenty of the one thousand total in the general game example of FIGS. 19 and 20) would be available for social networking play. Therefore by monitoring the dynamic s, $V_s$, and $A_s$ and other data for the sub-games in play the parameters of the to be released sub-games can be adjusted to ensure that the final EV is within expectations—e.g., puzzle time periods adjusted up or down, number of pieces of puzzles adjusted up or down, use of rarer pieces adjusted, prize value for a puzzle adjusted, etc.

In yet another embodiment, the sale price of social networking Digital Gate enabled tickets would be adjusted by monitoring the dynamic s, $V_s$, and $A_s$ and other data to ensure that the final EV is within expectations.

In still another embodiment, monitoring the dynamic s, $V_s$, and $A_s$ and other data can be used to determine the pricing of casino (lottery) catastrophic insurance. As its name implies, casino catastrophic insurance is consumer insurance against catastrophic losses, which in turn encourages the consumer to make more and larger bets. The concept is crudely analogous to buying a normal insurance policy with a very high deductible. In this type of policy, the insurer accepts the risk of a substantial loss, and the consumer pays a smaller premium to be protected against that loss. Essentially, casino catastrophic insurance works in the same way, by insuring the consumer that he cannot lose more than a certain amount (a very rare event), the consumer thus assured that his loses will not exceed a certain amount is free to play with the knowledge that he may win, but if he does not his loses will not exceed the threshold that he has already determined is acceptable.

What is claimed is:

1. A method for implementing a ticket-based, multi-component lottery game, comprising:

providing physical lottery tickets to one or more players, wherein the physical lottery tickets include a first playable game component with a first prize structure and one or more second playable game components with a second prize structure, wherein the second prize structure is different from the first prize structure, and wherein the one or more second game components are interactive Internet-based game components;

providing an access code on each of the physical lottery tickets that enable the one or more players to access a website to play the interactive Internet-based game components;

for at least one of the plurality of physical lottery tickets, providing a first validation code on the at least one of the physical lottery tickets that is used by a first game redemption system for validating and redeeming a first prize associated with the first game component of the at least one of the physical lottery tickets;

providing a second validation code on the at least one of the physical lottery tickets, the second validation code configured to validate and redeem a second prize associated with the Internet-based game component of the at least one of the physical lottery tickets, the second validation code being different from the access code associated with the at least one of the plurality of tickets and being unique to at least one of the plurality of tickets with respect to another different one of the plurality of physical lottery tickets;

for a winning play of the Internet-based game associated with the at least one of the plurality of physical lottery tickets, storing the associated second validation code in a winners data file;

assigning a winning credit amount, corresponding to the second prize, to the stored associated second validation code;

periodically transferring the winners data file to the first game redemption system so that the winning play of the Internet-based game associated with the at least one of the plurality of physical lottery tickets is redeemable for the second prize via the first game redemption system;

generating a completion indication upon completion of the Internet-based game associated with the at least one of the physical lottery tickets; and associating the completion indication with the second validation code associated with the at least one of the physical lottery tickets stored in the winners data file, wherein presence of the completion indication, is required, at the time of redemption of the at least one of the physical lottery tickets for the Internet-based game via the first game redemption system.

2. The method as in claim 1, wherein the completion indication is a third validation code that is generated upon completion of the Internet-based game and associated with the stored second validation code in the winners data file transferred to the first game redemption system.

3. The method as in claim 2, wherein the third validation code is presented to one of the or more players associated with the completion of the Internet-based game and must be presented by the one of the one or more players at the time of redemption of the associated physical lottery ticket.

* * * * *